(12) United States Patent
Tian

(10) Patent No.: US 10,789,215 B1
(45) Date of Patent: Sep. 29, 2020

(54) LOG-STRUCTURED STORAGE SYSTEMS

(71) Applicant: Alibaba Group Holding Limited, George Town (KY)

(72) Inventor: Shikun Tian, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/712,440

(22) Filed: Dec. 12, 2019

Related U.S. Application Data

(63) Continuation of application No. PCT/CN2019/105763, filed on Sep. 12, 2019.

(51) Int. Cl.
| | | |
|---|---|---|
| G06F 17/00 | (2019.01) | |
| G06F 16/182 | (2019.01) | |
| G06F 16/18 | (2019.01) | |
| G06F 16/215 | (2019.01) | |
| G06F 16/13 | (2019.01) | |

(52) U.S. Cl.
CPC .......... *G06F 16/1834* (2019.01); *G06F 16/13* (2019.01); *G06F 16/1805* (2019.01); *G06F 16/215* (2019.01)

(58) Field of Classification Search
CPC ........ G06F 3/0619; G06F 3/064; G06F 3/061; G06F 11/1471; G06F 12/0246; G06F 3/0608
See application file for complete search history.

(56) References Cited

U.S. PATENT DOCUMENTS

| | | |
|---|---|---|
| 4,774,654 A | 9/1988 | Pomerene et al. |
| 5,276,835 A | 1/1994 | Mohan et al. |
| 5,287,473 A | 2/1994 | Mohan et al. |
| 5,890,154 A | 3/1999 | Hsiao et al. |
| 5,926,834 A | 7/1999 | Carlson et al. |
| 6,021,408 A | 2/2000 | Ledain et al. |
| 6,289,418 B1 | 9/2001 | Koppala |
| 6,532,531 B1 | 3/2003 | O'Connor et al. |
| 8,315,995 B1 | 11/2012 | Levy |

(Continued)

FOREIGN PATENT DOCUMENTS

| | | |
|---|---|---|
| CN | 108646983 | 10/2018 |
| CN | 109034809 | 12/2018 |
| CN | 109241359 | 1/2019 |

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Truong V Vo

(74) *Attorney, Agent, or Firm* — Fish & Richardson P.C.

(57) ABSTRACT

Disclosed herein are methods, systems, and apparatus, including computer programs encoded on computer storage devices, for data processing and storage. One of the methods includes receiving, by a storage system, a processing request of data of a centralized ledger system. Types of the data of the centralized ledger system include block data, transaction data, and index data. The storage system determines a type of the data among the types of the data of the centralized ledger system, and applies a type of a processing engine specified for processing the type of the data according to a characteristic of the type of the data.

20 Claims, 14 Drawing Sheets

(56) References Cited

U.S. PATENT DOCUMENTS

| | | |
|---|---|---|
| 8,321,645 B2 | 11/2012 | Rabii et al. |
| 8,751,725 B1 | 6/2014 | Gangadharan et al. |
| 9,223,843 B1 | 12/2015 | Madhavarapu et al. |
| 9,665,630 B1 | 5/2017 | Bigman et al. |
| 9,697,213 B1 | 7/2017 | Faibish et al. |
| 9,734,021 B1 | 8/2017 | Sanocki et al. |
| 9,785,510 B1 | 10/2017 | Madhavarapu et al. |
| 9,552,242 B1 | 12/2017 | Leshinsky et al. |
| 9,880,933 B1 | 1/2018 | Gupta et al. |
| 9,946,657 B1 | 4/2018 | Muthukkaruppan et al. |
| 10,013,440 B1 | 7/2018 | Gupta et al. |
| 10,176,212 B1 | 1/2019 | Prohofsky |
| 10,210,167 B1 | 2/2019 | Sorenson, III |
| 10,296,258 B1 | 5/2019 | Richardson |
| 10,417,190 B1 | 9/2019 | Donlan et al. |
| 10,474,656 B1 | 11/2019 | Bronnikov |
| 10,484,174 B1 | 11/2019 | Bernat et al. |
| 10,489,343 B2 | 11/2019 | Faibish et al. |
| 2005/0102300 A1 | 5/2005 | Madsen |
| 2007/0179995 A1 | 8/2007 | Prahlad et al. |
| 2007/0185926 A1 | 8/2007 | Prahlad et al. |
| 2007/0226179 A1 | 9/2007 | Iwata et al. |
| 2008/0016515 A1 | 1/2008 | Naim et al. |
| 2008/0077682 A1 | 3/2008 | Nair et al. |
| 2008/0077735 A1 | 3/2008 | Kishi et al. |
| 2011/0252201 A1 | 10/2011 | Koren et al. |
| 2012/0072656 A1 | 3/2012 | Archak et al. |
| 2013/0117515 A1 | 5/2013 | Ashmore et al. |
| 2013/0246711 A1 | 9/2013 | Testardi et al. |
| 2014/0244937 A1 | 8/2014 | Bloomstein et al. |
| 2014/0279920 A1 | 9/2014 | Madhavarapu et al. |
| 2014/0279929 A1 | 9/2014 | Gupta et al. |
| 2014/0281123 A1 | 9/2014 | Weber |
| 2014/0351505 A1 | 11/2014 | Chiu et al. |
| 2014/0351515 A1 | 11/2014 | Chiu et al. |
| 2015/0058556 A1 | 2/2015 | Hamedani et al. |
| 2016/0011979 A1 | 1/2016 | Islam et al. |
| 2016/0011980 A1 | 1/2016 | Koike et al. |
| 2016/0077988 A1 | 3/2016 | Tipton et al. |
| 2016/0283140 A1 | 9/2016 | Kaushik |
| 2016/0350357 A1 | 12/2016 | Palmer |
| 2016/0357639 A1 | 12/2016 | Winokur |
| 2017/0124077 A1 | 5/2017 | Watanabe et al. |
| 2017/0206532 A1 | 7/2017 | Choi |
| 2017/0236120 A1* | 8/2017 | Herlihy .............. G06Q 20/3827 705/67 |
| 2017/0236123 A1 | 8/2017 | Ali et al. |
| 2017/0271030 A1 | 9/2017 | Li |
| 2017/0329552 A1 | 11/2017 | Baldwin et al. |
| 2018/0041580 A1 | 2/2018 | Kadowaki et al. |
| 2018/0089041 A1 | 3/2018 | Smith et al. |
| 2018/0114045 A1 | 4/2018 | Ebrahimi et al. |
| 2018/0152289 A1 | 5/2018 | Hunt et al. |
| 2018/0189333 A1 | 7/2018 | Childress et al. |
| 2018/0218027 A1 | 8/2018 | Cronie et al. |
| 2018/0268151 A1 | 9/2018 | Cuomo et al. |
| 2018/0276263 A1 | 9/2018 | Voigt et al. |
| 2018/0300240 A1 | 10/2018 | Li et al. |
| 2018/0332366 A1 | 11/2018 | Paduroiu |
| 2018/0332367 A1 | 11/2018 | Kaitchuck et al. |
| 2018/0374094 A1 | 12/2018 | Kohli |
| 2019/0012270 A1 | 1/2019 | Imazaki et al. |
| 2019/0036778 A1 | 1/2019 | Bathen et al. |
| 2019/0042620 A1 | 2/2019 | Garagiola et al. |
| 2019/0050831 A1 | 2/2019 | Kikinis |
| 2019/0095458 A1 | 3/2019 | Saradhi et al. |
| 2019/0095879 A1 | 3/2019 | Eyal et al. |
| 2019/0121889 A1 | 4/2019 | Gold et al. |
| 2019/0140935 A1 | 5/2019 | Kikinis |
| 2019/0158270 A1 | 5/2019 | Berti |
| 2019/0171365 A1 | 6/2019 | Power et al. |
| 2019/0179939 A1 | 6/2019 | Govindarajan et al. |
| 2019/0180372 A1 | 6/2019 | Creighton, IV et al. |
| 2019/0188079 A1 | 6/2019 | Kohli |
| 2019/0213123 A1 | 7/2019 | Agarwal |
| 2019/0245680 A1 | 8/2019 | Boutaba et al. |
| 2019/0265891 A1 | 8/2019 | Barber et al. |
| 2019/0278719 A1 | 9/2019 | Ashmore et al. |
| 2019/0286373 A1 | 9/2019 | Karumbunathan et al. |
| 2019/0303579 A1 | 10/2019 | Reddy et al. |
| 2019/0342384 A1 | 11/2019 | Pradhan et al. |
| 2019/0363890 A1 | 11/2019 | Johnson |
| 2019/0370012 A1 | 12/2019 | Sears et al. |
| 2019/0370225 A1 | 12/2019 | Saradhi et al. |
| 2020/0014528 A1 | 1/2020 | Nandakumar et al. |
| 2020/0028800 A1 | 1/2020 | Strathman et al. |
| 2020/0034311 A1 | 1/2020 | Wang |
| 2020/0050595 A1 | 2/2020 | Sun et al. |
| 2020/0073758 A1 | 3/2020 | Natarajan et al. |
| 2020/0073962 A1 | 3/2020 | Natarajan et al. |
| 2020/0076571 A1 | 3/2020 | Natarajan et al. |
| 2020/0081648 A1 | 3/2020 | Bernat et al. |
| 2020/0082890 A1 | 3/2020 | Karr et al. |

OTHER PUBLICATIONS

Github.com [online], "Compaction," Oct. 2019, retrieved on Feb. 4, 2020, retrieved from URL<https://github.com/facebook/rocksdb/wiki/Compaction>, 9 pages.

Kakoulli et al., "OctopusFS: A Distributed File System with Tiered Storage Management", ACM International Conference, May 2017, 14 pages.

Nakamoto, "Bitcoin: A Peer-to-Peer Electronic Cash System," www.bitcoin.org, 2005, 9 pages.

Wikipedia.org [online], "Log-structured merge-tree," Jan. 2020, retrieved on Feb. 4, 2020, retrieved from URL<https://en.wikipedia.org/wiki/Log-structured_merge-tree>, 2 pages.

U.S. Appl. No. 16/712,323, Tian, filed Dec. 12, 2019.
U.S. Appl. No. 16/712,393, Tian, filed Dec. 12, 2019.
U.S. Appl. No. 16/712,436, Tian, filed Dec. 12, 2019.
U.S. Appl. No. 16/712,469, Tian, filed Dec. 12, 2019.
U.S. Appl. No. 16/712,506, Tian, filed Dec. 12, 2019.
U.S. Appl. No. 16/712,532, Tian, filed Dec. 12, 2019.
U.S. Appl. No. 16/712,696, Tian, filed Dec. 12, 2019.
U.S. Appl. No. 16/712,785, Tian, filed Dec. 12, 2019.

PCT International Search Report and Written Opinion in International Application No. PCT/CN2019/105763, dated Jun. 10, 2020, 9 pages.

* cited by examiner

LOG-STRUCTURED STORAGE SYSTEMS

CROSS-REFERENCE TO RELATED APPLICATIONS

This application is a continuation of PCT Application No. PCT/CN2019/105763, filed on Sep. 12, 2019, which is hereby incorporated by reference in its entirety.

TECHNICAL FIELD

This specification relates to a log-structured storage system.

BACKGROUND

Distributed ledger systems (DLSs), which can also be referred to as consensus networks, and/or blockchain networks, enable participating entities to securely and immutably store data. DLSs are commonly referred to as blockchain networks without referencing any particular user case. Examples of types of blockchain networks can include public blockchain networks, private blockchain networks, and consortium blockchain networks. A consortium blockchain network is provided for a select group of entities which control the consensus process and includes an access control layer.

Typically, each node (e.g., a blockchain network node) of a DLS stores or has a complete backup of blockchain network data, so that each node can be independent and the local data at each node can be trusted for providing services. However, this storage scheme imposes demanding storage requirements and adds storage costs for each node, especially as the DLS scales. Therefore, solutions for improving efficiency and reducing cost of a storage system would be desirable.

SUMMARY

This specification describes technologies for a log-structured storage system for storing data, for example, in a distributed ledger system (e.g., a blockchain network) and/or a blockchain-based centralized ledger system (e.g., a universal auditable ledger service system) that adopts a data structure of a blockchain to leverage immutability, reliability, and trustworthiness of data stored on the blockchain.

This specification also provides one or more non-transitory computer-readable storage media coupled to one or more processors and having instructions stored thereon which, when executed by the one or more processors, cause the one or more processors to perform operations in accordance with embodiments of the methods provided herein.

This specification further provides a system for implementing the methods provided herein. The log-structured storage system 300 includes one or more processors, and a computer-readable storage medium coupled to the one or more processors having instructions stored thereon which, when executed by the one or more processors, cause the one or more processors to perform operations in accordance with embodiments of the methods provided herein.

It is appreciated that methods in accordance with this specification may include any combination of the aspects and features described herein. That is, methods in accordance with this specification are not limited to the combinations of aspects and features specifically described herein, but also include any combination of the aspects and features provided.

The details of one or more embodiments of this specification are set forth in the accompanying drawings and the description below. Other features and advantages of this specification will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
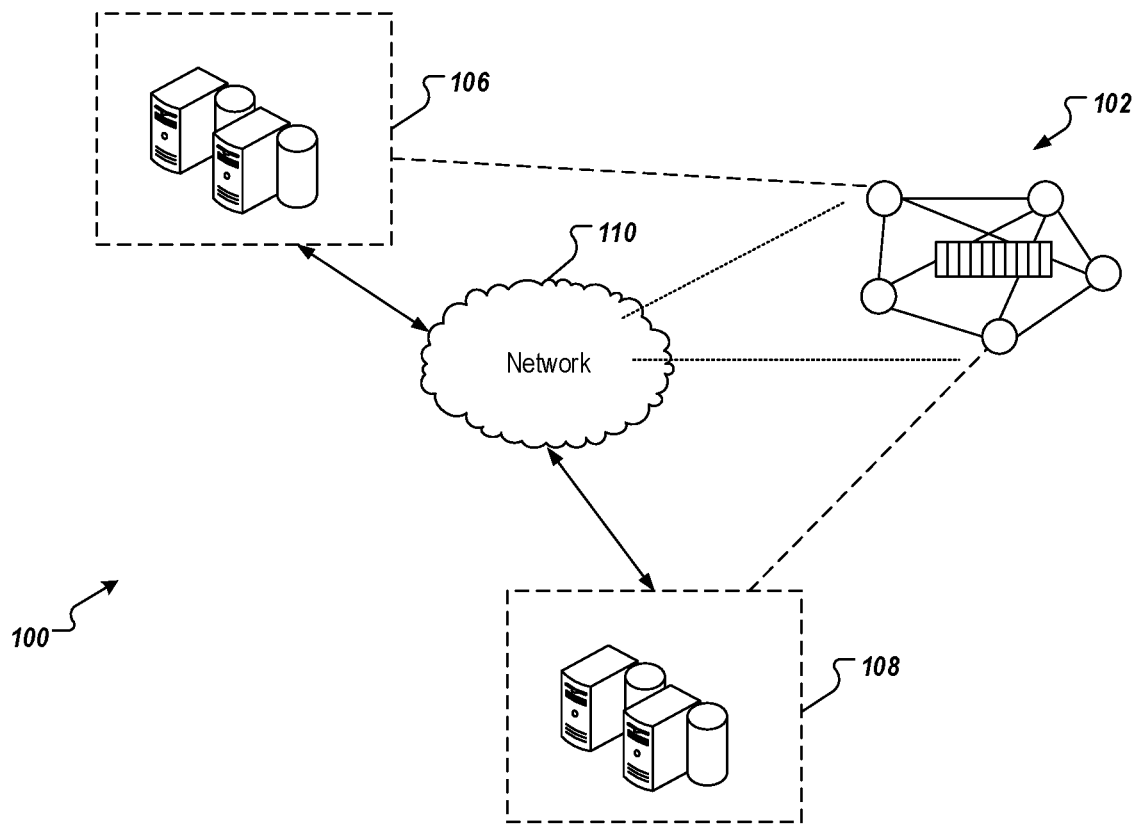
FIG. 1 is a diagram illustrating an example of an environment that can be used to execute embodiments of this specification.

This specification describes technologies for a log-structured storage system for storing data, for example, in a distributed ledger system (e.g., a blockchain network) and/or a blockchain-based centralized ledger system (e.g., a universal auditable ledger service system) that adopts a data structure of a blockchain to leverage immutability, reliability, and trustworthiness of data stored on the blockchain. In some embodiments, the distributed ledger system and the blockchain-based centralized ledger system can be collectively referred to as a blockchain-based ledger system.

In some embodiments, the blockchain-based centralized ledger system can be a ledger system based on centralization, which can provide a cryptographically verifiable state-independent data ledger storage with time-critical auditing (with non-repudiation and temper-resistance). In some embodiments, the blockchain-based centralized ledger system can provide a ledger service based on a cloud platform featuring centralized endorsement with credibility and neutrality. The blockchain-based centralized ledger system can provide highly reliable and high-performance auditable streaming ledger services, which combines blockchain systems' high credibility and centralized systems' high performance and low latency for handling various types of data and logs with auditing requirements, traceability, and tracking.

The techniques described in this specification produce several technical effects. In some embodiments, the described techniques can be applied in various applications and scenarios to provide efficient, trusted, scalable, cost effective, and high-performance data storage and management. The described techniques can provide a simple and well-defined set of application interfaces (APIs) for blockchain data including, for example, transaction data, block data, state data, and index data.

The described techniques provide a log-structured storage system that not only provides I/O services but also take into account costs and customization needs to provide functionalities such as tiering, data compression, shared storage, erasure coding, and snapshot of states, especially after the amount of data stored in the blockchain system scales. The log-structured storage system can provide features such as log-structured data storage and asynchronous and/or concurrent processing so as to achieve performance optimization, efficient processing, trusted environment, universality (e.g., used for both distributed ledger system and blockchain-based centralized ledger system), and improved storage scheme. The described techniques can provide an overall framework or architecture for providing such functionalities and features.

In general, data generated and/or stored in a distributed ledger system (e.g., a blockchain network) can be referred to as blockchain data. The blockchain data can include or be categorized into transaction data, block data, state data, and index data. In some embodiments, data generated and/or stored in a blockchain-based centralized ledger system (e.g., a universal auditable ledger service system) can include or be categorized into transaction data, block data, and index data.

In some embodiments, each type of the blockchain data can be received in the form of a key-value pair (KVPs) expressed as <hash (value), value>. The value can actual data of one or more of a block, a transaction, or a state of a blockchain network. The key can be the hash of the value.

In some embodiments, for block data, each block can include a block header and a block body. The block header can include identity information of a particular block and the block body can include transactions that are confirmed with the block. In some embodiments, the block data is a data structure in the blockchain system and typically has one or more of the following characteristics. For example, (1) after a consensus is reached in the blockchain network, the content of the block data stored in each node of the blockchain network is consistent theoretically. (2) The block number is densely incremented. (3) Hash entanglement exists between consecutive blocks. (4) The block data is append-only. That is, once the consensus is reached, the history block data will not be modified. (5) The access frequency of the block data is typically low. The storage space occupied by the block data is often large.

In some embodiments, state data can be assembled to a globally shared state (also referred to as a world state). The world state can include a mapping between an account address and an account state. The world state can be stored in data structures such as a Merkle Patricia tree (MPT). In some embodiments, for example, in a smart contract scenario, the state data can be designed based on the content of a Merkle Tree. It is an incremental content-addressed data set. The storage space occupied by the state data is often large.

In some embodiments, the state data can be further categorized into a current state and a history state. In some embodiments, the current state is the state data corresponding to the latest block and is the data source when the latest transaction on the blockchain network is executed. In some embodiments, the history state is a content-addressed data set that stores all state data from the genesis block to the latest block. In some embodiments, the history state data is stored in a historic state tree. The historic state tree can store state information as key-value pairs (KVPs) expressed as <hash (node value), node value>, which is content-addressable. The value or node value can be account states of accounts associated with the blockchain node and the key can be the hash values of the corresponding account states. In some embodiments, current state data is stored in a current state tree. In some embodiments, the current state tree can be location-addressed based on one or more location related identifiers (IDs). For example, the current state tree can store state information as KVPs expressed as <node ID, node value>, where the node values can be addressed based on their corresponding node IDs.

In some embodiments, transaction data can include data related to inputs and outputs of a series of operations. In some embodiments, the transaction data can include data related to exchanges of things of value (e.g., assets, products, services, currency).

In some embodiments, the index data can indicate a mapping correspondence between the data (e.g., transaction data, block data, and state data) and the data log files that store the data so as to address or retrieve the data. In some embodiments, the index data can indicate a physical location of a corresponding data stored in a storage system. In some embodiments, the index data can include one or more of an index indicating a correspondence from a block hash to a block number, an index indicating a correspondence from a block hash to a storage location, an index indicating a correspondence from a transaction hash to a transaction, or an index indicating a correspondence from a receipt hash to a receipt. In some embodiments, the index data does not include the content of the blockchain data.

When more and more transactions are entered into the blockchain, blockchain data (e.g., state data and block data) can grow larger in size. In a DLS, every node of the DLS stores an entire copy of the blockchain, which can take a large amount of storage spaces, even if some of the old block data or state data are not frequently visited.

In some embodiments, blockchain data are stored by the log-structured system in data files, and the data files are continuously appended and divided based on time. In some embodiments, data may not be rearranged according to key sorting (e.g., data is not sorted by key values or other metric so that hot and cold data are not mixed in multiple data log files), thus greatly reducing the technical challenges of tiering implementation.

In some embodiments, the log-structured storage system stores the blockchain data using two types of append-only data files to provide data persistence, data log files and index log files. For example, block data, transaction data, state data, and additional self-descriptive data can be stored in data log files, while index data indicating storage locations of the transaction data, block data, and state data (e.g., identifiers and offsets of the data log files) can be stored in index log files.

Among the blockchain data, the transaction data and the block data can be log-structure friendly, which can include append-only data such that these data can be written to the data log files by directly adding or appending them to the corresponding data log files. In some embodiments, write of the transaction data and the block data does not require substantial compaction. For example, it can require a relatively small amount of transaction reproduction and may not require block rollback. In some embodiments, the state data can be log-structure friendly data such that the history state data can increase without requiring compaction.

In some embodiments, the log-structured storage system can support multi-level data tiering, and support multiple types of storage devices such as cloud disks, network attached systems (NAS), and object storage services (OSS) (low frequency, archive). For example, the log files can be stored in cloud-based storage systems, NAS or OSS devices, or self-built distributed storage systems.

In some embodiments, different types of log files can have different storage strategies. For example, data log files that are not accessed for a relatively long time can be stored in inexpensive and relatively low-speed storage devices such as NAS/OSS, and can be processed using compression and erasure coding for storage. As another example, index log files can be stored on high-speed storage devices such as cloud disks.

In some embodiments, the log-structured storage system can perform data tiering by using least recently used (LRU) memory cache and disk cache to optimize read performance of low-speed storage devices.

In some embodiments, the log-structured storage system can provide a tier pool manager that manages multiple levels of pools of storage devices. In some embodiments, each pool supports multiple disks or storage devices in a cluster. The tier pool manager can manage the space, pressure, and health of the pools. In some embodiments, the log-structured storage system can provide a migration task manager that manages two-way migration tasks for data between different levels of storage devices, manages the life cycle of migration tasks, result callbacks, statistics, etc. In some embodiment, the log-structured storage system can provide a migration scheduler that supports pluggable policies, manages data migration strategies, and provides data create/query/update/delete interfaces.

The disclosed log-structured storage system adopts the idea of a merge-tree (LSM-Tree) architecture. In some embodiments, the log-structured storage system can include multiple log-structured storage instances (or streams), where each log-structured storage instance is responsible for storing and managing data for a distributed ledger system (e.g., a blockchain system) or a blockchain-based centralized ledger system. In some embodiments, the log-structured storage system can convert random write operations into sequential append operations so as to mitigate write amplification issues resulting from frequent "dirty" page flush due to large number of random write operations. In some embodiments, the log-structured storage system can delay write flush operations in high-performance scenarios and reduce the number of sync operations to improve the efficiency and performance of the overall system.

To provide further context for embodiments of this specification, and as introduced above, distributed ledger systems (DLSs), which can also be referred to as consensus networks (e.g., made up of peer-to-peer nodes), and blockchain networks, enable participating entities to securely and immutably conduct transactions, and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, transactions recorded on a blockchain are reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining whether it is consistent with the structure of the tree.

In some embodiments, a blockchain can be implemented in a distributed or decentralized or at least partially decentralized manner for storing transactions, for example, in a blockchain network that is a network of computing nodes. Each of the computing nodes (also referred to as a blockchain network node) can manage, update, and maintain one or more blockchains by broadcasting, verifying, and validating transactions, etc. As introduced above, a blockchain network can be provided as a public blockchain network, a private blockchain network, or a consortium blockchain network. Embodiments of this specification are described in further detail herein with reference to a consortium blockchain network. It is contemplated, however, that embodiments of this specification can be realized in any appropriate type of blockchain network.

In general, a consortium blockchain network is private among the participating entities. In a consortium blockchain network, the consensus process is controlled by an authorized set of nodes, which can be referred to as consensus nodes, one or more consensus nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network.

In some examples, within a consortium blockchain network, a global blockchain is provided as a blockchain that is replicated across all nodes. That is, all consensus nodes are in perfect state consensus with respect to the global blockchain. To achieve consensus (e.g., agreement to the addition of a block to a blockchain), a consensus protocol is implemented within the consortium blockchain network. For example, the consortium blockchain network can implement a practical Byzantine fault tolerance (PBFT) consensus, described in further detail below.

In some embodiments, a centralized ledger system can also adopt the data structure of a blockchain to leverage immutability, reliability, and trustworthiness of data stored on a blockchain. In some embodiments, such as centralized ledger system can be referred to as a blockchain-based centralized ledger system or a universal auditable ledger service system. In some embodiments, the blockchain-based centralized ledger system can include a central trusted authority that provides transparent, immutable, and cryptographically verifiable data that are stored in blocks of a blockchain data structure. The stored data can be in a log format, including, for example, not only for transaction logs but also other transaction data and block data. Due to the existence of the central trusted authority, the blockchain-based centralized ledger system does not need to perform consensus processes to establish trust. In some embodiments, the blockchain-based centralized ledger system can be more efficient compared to a typical blockchain-based distributed or decentralized ledger system. In some embodiments, the blockchain-based centralized ledger system can provide a cloud-based storage service with enhanced trust, efficiency, and storage performance.

FIG. 1 is a diagram illustrating an example of an environment 100 that can be used to execute embodiments of this specification. In some examples, the environment 100 enables entities to participate in a consortium blockchain network 102. The environment 100 includes computing devices 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or each computing device 106, 108 can be a separate cloud computing system including a number of computers interconnected by a network and functioning as a distributed processing system.

In the depicted example, the computing devices 106, 108 can each include any appropriate computing system that enables participation as a node in the consortium blockchain network 102. Examples of computing devices include, without limitation, a server, a desktop computer, a laptop computer, a tablet computing device, and a smartphone. In some examples, the computing devices 106, 108 host one or more computer-implemented services for interacting with the consortium blockchain network 102. For example, the computing device 106 can host computer-implemented services of a first entity (e.g., user A), such as a transaction management system that the first entity uses to manage its transactions with one or more other entities (e.g., other users). The computing device 108 can host computer-implemented services of a second entity (e.g., user B), such as a transaction management system that the second entity uses to manage its transactions with one or more other entities (e.g., other users). In the example of FIG. 1, the consortium blockchain network 102 is represented as a peer-to-peer network of nodes, and the computing devices 106, 108 provide nodes of the first entity, and second entity respectively, which participate in the consortium blockchain network 102.

Figure 2:
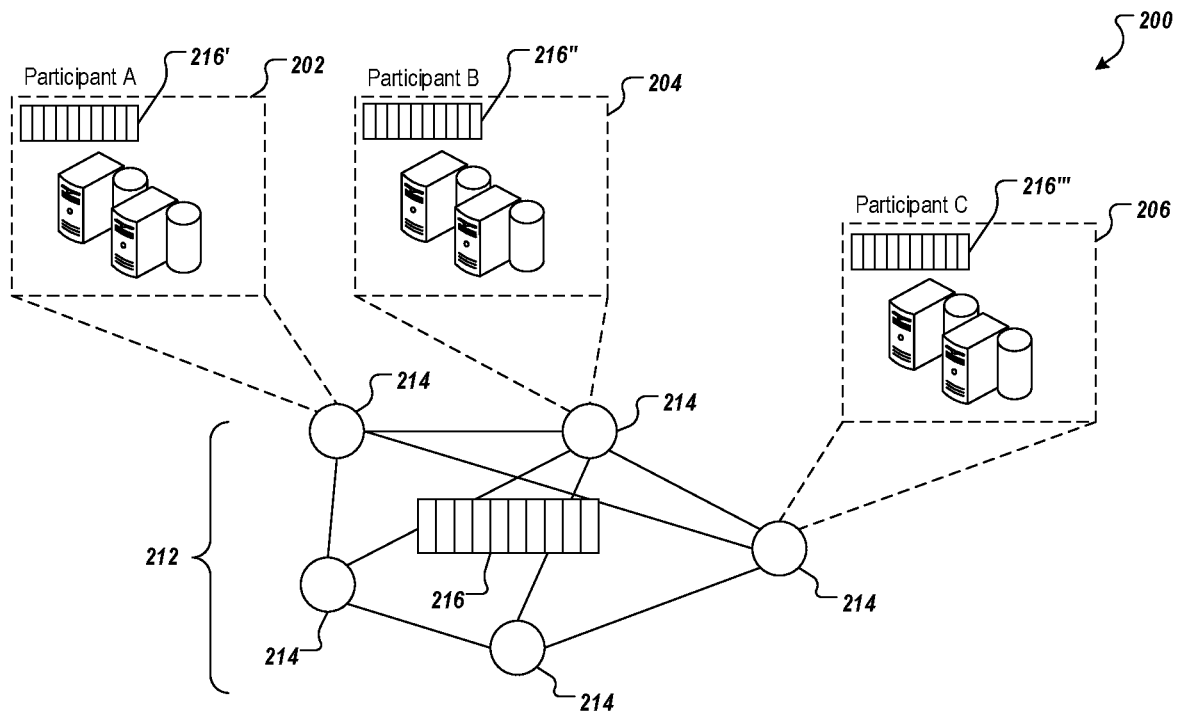
FIG. 2 is a diagram illustrating an example of an architecture in accordance with embodiments of this specification.

FIG. 2 is a diagram illustrating an example of an architecture 200 in accordance with embodiments of the specification. The example conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as miner nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, and 206 store respective, complete copies 216', 216", 216''' of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of a transaction can include, without limitation, exchanges of something of value (e.g., assets, products, services, currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, the consensus node generates a block header, hashes all of the transactions in the block, and combines the hash value in pairs to generate further hash values until a single hash value is provided for all transactions in the block (the Merkle root hash). This hash is added to the block header. The consensus node also determines the hash value of the most recent block in the blockchain (i.e., the last block added to the blockchain). The consensus node also adds a nonce value, and a timestamp to the block header.

In general, PBFT provides a practical Byzantine state machine replication that tolerates Byzantine faults (e.g., malfunctioning nodes, malicious nodes). This is achieved in PBFT by assuming that faults will occur (e.g., assuming the existence of independent node failures, and/or manipulated messages sent by consensus nodes). In PBFT, the consensus nodes are provided in a sequence that includes a primary consensus node, and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus node proves that a message is received from a specified peer node, and verifies that the message was not modified during transmission.

In PBFT, the consensus protocol is provided in multiple phases with all consensus nodes beginning in the same state. To begin, a client sends a request to the primary consensus node to invoke a service operation (e.g., execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
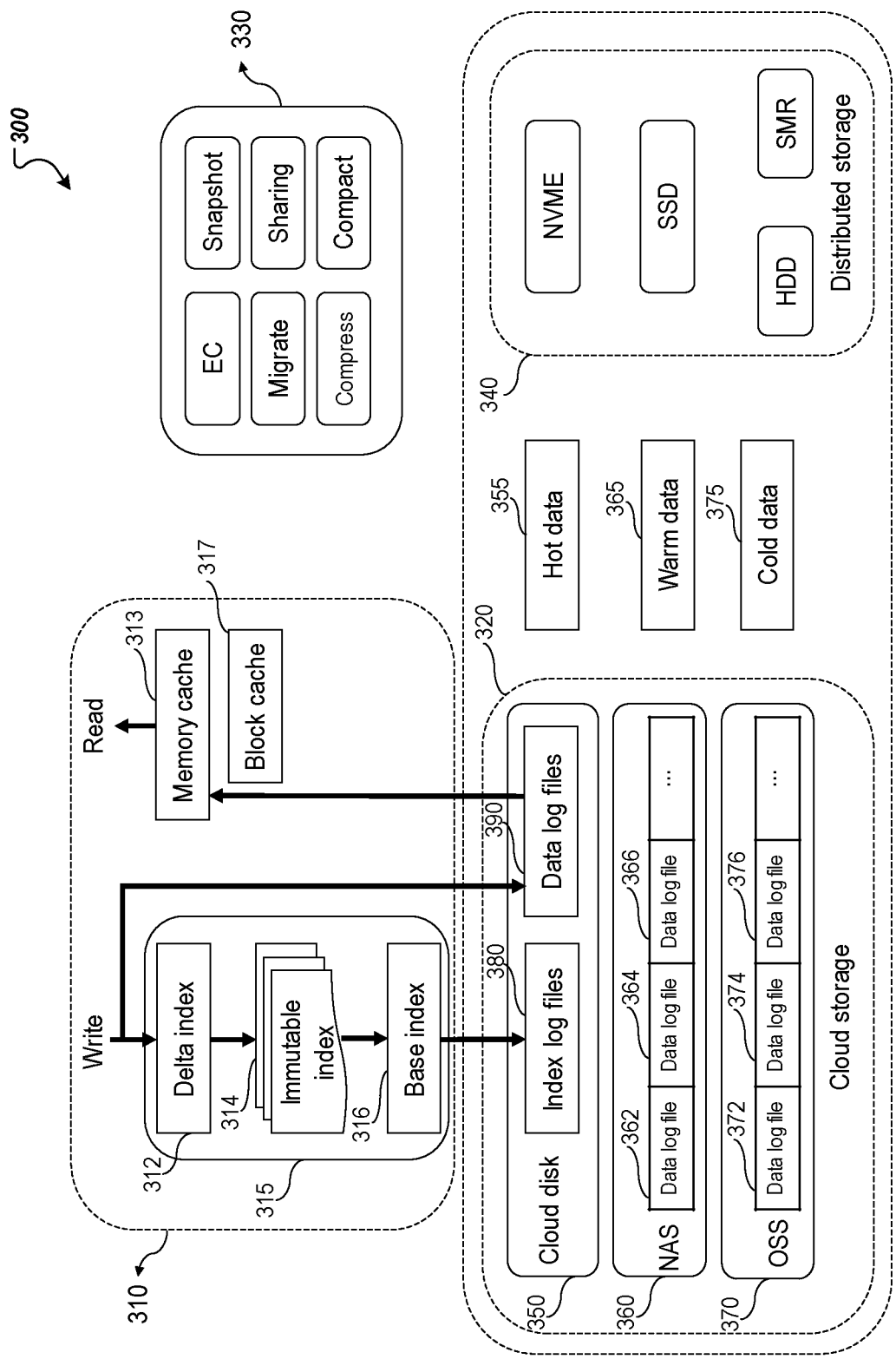
FIG. 3 is a diagram illustrating an example of a blockchain-based log-structured storage system in accordance with embodiments of this specification.

FIG. 3 is a diagram illustrating an example of a log-structured storage system 300 in accordance with embodiments of this specification. The log-structured storage system 300 can store data of a distributed ledger system (e.g., a blockchain network) and/or a blockchain-based centralized ledger system (e.g., a universal auditable ledger service system) that stores data on one or more blockchains (collectively, referred to as a blockchain-based ledger system).

In some embodiments, the log-structured storage system 300 can be implemented by each consensus node of a blockchain network or a central node of the blockchain-based centralized ledger system. In some embodiments, the log-structured storage system 300 can be connected to a distributive storage system 340 built by a client node of the blockchain-based ledger system. As shown, the log-structured storage system 300 includes a front-end input/output (I/O) subsystem 310, a multi-tier storage subsystem 320, and a back-end data management subsystem 330. In some embodiments, the front-end I/O subsystem 310 can perform write operations to write data into data files (e.g., data log files and index log files) that are stored in the multi-tier storage subsystem 320, and perform read operations to access data from the data files that are stored in the multi-tier storage subsystem 320. In some embodiments, the back-end data management subsystem 330 can process, reorganize, and otherwise manage the data in the data files according to different needs, so as to improve the efficiency and performance of the overall system.

The front-end I/O subsystem 310 can include any suitable computing elements (e.g., one or more of a processor, a memory 315, etc.) to perform the methods as described herein. In some embodiments, the front-end I/O subsystem 310 can perform front-end I/O operations including various read and write operations (e.g., insert, update, delete, query, etc.) on multiple types of data elements.

In some embodiments, all the data elements (e.g., transaction data, block data, and state data) that are processed by the front-end I/O subsystem 310 can be stored in a log file format, whether the log file is from write operations or files generated from the operations of the back-end data management subsystem 330, such as storage tiering, compaction, data compression, erasure coding, etc.

In some embodiments, data that are processed by the front-end I/O subsystem 310 can be stored in the following two types of log files: (1) data log files (e.g., data log files 390, 362, 364, 366, 372, 374, and 376) that store substantive data such as blockchain data (e.g., transaction data, block data, state data) and self-descriptive metadata; and (2) index log files (e.g., index log files 380) that store index information that indicate physical locations of the data (e.g., identifiers and offsets of the data log files). In some embodiments, the data log file does not store index information, whereas the index information is maintained by a separate index log file.

In some embodiments, the front-end I/O subsystem 310 can be configured to perform write operations to write blockchain data into data log files 390. In some embodiments, the blockchain data can include block data, transaction data, or state data generated by a blockchain network or a distributed ledger system. In some embodiments, the blockchain data can include block data and transaction data generated by a blockchain-based centralized ledger system. In some embodiments, data written to the data log files 390 can include metadata describing the data blocks, such as transaction hash values and sequence values, block hash values and block numbers, snapshot version numbers, cyclic redundancy check (CRC) code, encryption information, and so on. In some embodiments, the data log files 390 can be an append-only file.

In some embodiments, the front-end I/O subsystem 310 can be configured to generate an index that indicates a physical location of a corresponding data stored in the log-structured storage system 300 (e.g., in a data log file in the multi-tier storage subsystem 320). In some embodiments, the index can be stored in an index log file 380. In some embodiments, the data log file and the index log file can be stored in the multi-tier storage subsystem 320. In some embodiments, the index can be stored in an index log file 380 that is stored in one storage device that has the fastest access speed among the storage devices of the multi-tier storage subsystem 320.

In some embodiments, the data log file can be continuously updated based on data write or append operations. In some embodiments, a data log file can have a configurable maximum length, for example, between 512 MB and 2 GB. In some embodiments, a data log file can be sealed or set to be read-only, and a new data log file can be assigned for new write operations if it is determined that the data log file has reached the maximum length or size.

In some embodiments, the front-end I/O subsystem 310 can perform write operations including modifications to the data that are stored in the log-structured storage system 300.

In some embodiments, modifications to the data are processed by the front-end I/O subsystem 310 by adding or appending data to the data log files in a log format so as to not overwrite the original data. In some embodiments, the data log files can form a layer of write-ahead log (WAL), which can be used for crash recovery.

In some embodiments, the front-end I/O subsystem 310 stores index information in the memory 315 that indicates a mapping correspondence between the data (e.g., transaction data, block data, and state data) and the data log files that store the data so as to address or retrieve the data. In some embodiments, the index data in the memory can be organized using a log-structured merge (LSM) method. In some embodiments, the index of newly written data can be stored in the memory 315 and flushed into the index log file 380 when the memory usage exceeds a predetermined threshold value. As such, the indexes of old data can be stored in the index log file 380 in a disk storage or hard drive storage and free up space for caching an index of new hotspot data in the memory 315.

In some embodiments, the index data can include one or more of an index indicating a correspondence from a block hash to a block number, an index indicating a correspondence from a block hash to a storage location, an index indicating a correspondence from a transaction hash to a transaction, or an index indicating a correspondence from a receipt hash to a receipt. In some embodiments, index data for a blockchain-based centralized ledger system can include one or more of an index indicating a correspondence from a sequence to a transaction storage location, or an index indicating a correspondence from a timing sequence to a transaction hash.

In some embodiments, the front-end I/O subsystem 310 can include multiple in-memory index maps that are stored in the memory 315. In some embodiments, an in-memory index map can be regarded as any suitable component, unit, module, or data structure (e.g., a table or construct) for maintaining index data in the memories of the front-end I/O subsystem 310. The in-memory index map can be a key component of the front-end I/O subsystem 310 that determines extensibility and performance of the front-end I/O subsystem 310 and the overall log-structured storage system 300. In some embodiments, because blockchain data has strong time sensitivity and the most recently written transaction data and block data has a relatively high chance of being visited again, the log-structured storage system 300 can store the index of hot data in the index map in the memory 315 to improve the performance of the overall log-structured storage system 300.

In some embodiments, an in-memory index map can maintain one or more of an index indicating a mapping from a transaction hash value to a sequence value, or an index indicating a mapping from a block hash value and block number to a physical location of the data. In some embodiments, the front-end I/O subsystem 310 regularly persistents checkpoints of the index map in the memory 315 to an index log file. For example, the front-end I/O subsystem 310 can capture a snapshot of the index data in the memory 315 periodically or at a certain time point and store the snapshot in the index log file 380 in the multi-tier storage subsystem 320. This can create a point in time in which the log-structured storage system 300 can apply changes contained in the index log file 380 during recovery after an unexpected shut down or crash of the log-structured storage system 300. In some embodiments, the front-end I/O subsystem 310 can read data (e.g., transaction data, block data, and state data)

by inquiring the in-memory index map and determining a current location of the requested data.

In some embodiments, a complete checkpoint of the in-memory index map can be written to an index log file when the index log file is created. In some embodiments, the index log file can be updated by processing the index of the write operations in batches. In some embodiments, the batch size can be dynamically configurable, such as thousands of transaction write operations, or a few megabyte (MB) of write operations. In some embodiments, when an index log file has been updated for a certain number of batches of the write operations, the index log file can be sealed or set to read-only, and a new index log file can be created to write new data.

In some embodiments, to recover from abnormal crashes, the front-end I/O subsystem 310 can load the index log file (e.g., the index log file 380) into the memory 315 and scan the page bottom of the data log file 390 to ensure consistency of the data log file 390 and the index log file 380. In some embodiments, the index log file may fall behind a few batches to the data log file and so the recovery time can take limited I/O resources and time.

In some embodiments, index of newly written transaction data and block data can be added to the index map and index log file, but index of existing transaction data and block data may not be modified, except in replay attacks and blocks rollback scenarios. In some embodiments, in order to achieve high concurrency for read and write operations, the in-memory index map can be divided into read-only base index map 316 and read-write delta index map 312. In some embodiments, the base index map 316 can store indexes of cold data and the delta index map 312 can store indexes of newly written data. In some embodiments, hash indexes can be stored in a hash table, and sequence indexes can be stored in a B-tree.

In some embodiments, during a write operation of the front-end I/O subsystem 310, the index information of data can be updated to the delta index map 312 first. During a read operation, the front-end I/O subsystem 310 can search the delta index map 312 first for requested data. If the requested data is not found in the delta index map 312, the front-end I/O subsystem 310 can subsequently search the base index map 316.

In some embodiments, the front-end I/O subsystem 310 can regularly flush the index data from the memory 315 to the index log files 380. In some embodiments, a basic procedure of index flush can include the following operations: (1) combining the delta index map 312 and the base index map 316; (2) performing persistence processing on the base index map 316 (e.g., storing the base index map to an index log file); (3) releasing partial or the whole base index map 316 from memory 315; and (4) swapping index data by reading requested index data to the memory 315.

In some embodiments, the front-end I/O subsystem 310 can convert the delta index map 312 in the memory 315 to immutable index maps 314, and then flush them to the index log file 380, and create a new delta index map to receive indexes generated according to new requests. As such, storage occupation of the delta index map can be reduced to improve the performance of the log-structured storage system 300.

In some embodiments, in order to reduce the impact on the front-end I/O, index maps in the memory can be asynchronously merged on the back end. In some embodiments, the merging process can be triggered by at least one of the following two conditions: (1) a size of the delta index map exceeds a predetermined threshold; and (2) a new snapshot is created. In some embodiments, the front-end I/O subsystem 310 can generate a merge index map to include the immutable index maps 314 to be flushed into the index log file 380. In some embodiments, the front-end I/O subsystem 310 can combine the merge index map with the current base index map 316 to generate a new base index map.

In some embodiments, during operation, the front-end I/O subsystem 310 can run with multiple base index maps and index log files. In some embodiments, when compaction is needed for some scenarios, minor and major compaction can be performed regularly by combining all base index maps and delta index maps into one base index map. Major compaction mainly merges and manages the indexes, which can be used for scenarios such as snapshots, garbage collection loading, and index files management.

In some embodiments, major compaction can be performed by merging the base index maps and delta index maps and generating a new base index map, and storing it to a new index log file. In some embodiments, minor compaction can be performed by combining several index log files and generating a new index log file, which can reduce the number of index log files. In some embodiments, if a size of the current index log file reaches a predetermined threshold, the current index log file can be set to a sealed or immutable state and be closed, and a new index log file can be created for new index data.

In some embodiments, during read operations, if a search in the in-memory index map fails, two or more I/O operations may be needed, which can place a burden on the log-structured storage system 300. In some embodiments, the front-end I/O subsystem 310 can provide a multi-level cache mechanism with a memory cache 313 and a block cache 317 (e.g., using flash storage medium (e.g., SSD cloud disc)).

In some instances, the log-structured storage system 300 may receive a large read request such that the log-structured storage system 300 needs to access multiple data log files to fetch the complete requested data for a client. However, accessing multiple data log files can result in an overhead that is not insignificant. In some embodiments, the back-end data management subsystem 330 can perform a compaction operation to concatenate logically adjacent data blocks to reduce fragmentation. In some embodiments, compaction operation can have an overhead and can be performed when data fragmentation is severe.

In some embodiments, the multi-tier storage subsystem 320 can include multiple tiers of storage devices. A storage device can include a storage medium and corresponding software and/or hardware interfaces. In some embodiments, the multiple tiers of storage devices can include a number of storage devices that have different performance characteristics such as access speeds. For example, multiple tiers of storage devices can include cloud disks, network-attached storage (NAS) devices, and object storage service (OSS) devices. In some embodiments, the multiple tiers storage devices are tiered in a hierarchical structure in terms of one or more performance characteristics. In some embodiments, the one or more performance characteristics can include an access speed, an access bandwidth, or an access latency. For example, the multiple tiers storage devices can include a first tier storage device with a first performance characteristic (e.g., an access speed), and a second tier storage device with a second performance characteristic that is inferior to the first performance characteristic (e.g., a relatively lower access speed than the first tier storage device), and so on. As shown in FIG. 3, an example of the multi-tier storage subsystem 320 can include a first-tier storage device 350 including a cloud disk or cloud-based storage device (e.g., solid-state drive (SSD) cloud disk, embedded-SSD (ESSD) cloud disk), a second-tier storage device 360 including NAS devices, and a third-tier storage device 370 including OSS devices.

In some embodiments, the multiple tiers of storage devices can store different types of data. In some embodiments, data can be categorized into hot data 355, warm data 365, and cold data 375 based on, for example, a time that the data is generated or received or a frequency that the data is accessed. As an example, data of a latest transaction can be hot data; data of yesterday's transaction can be warm data, and data of a historic transaction taken place 1 week ago can be cold data. As another example, data in recently generated 10 blocks of a blockchain can be hot data; data in recently generated 11~20 blocks can be warm data, and data in other earlier blocks can be cold data. However, in some embodiments, a genesis block of a blockchain can be considered as hot data as it is frequently accessed.

In some embodiments, the multi-tier storage subsystem 320 can store the hot data 355, warm data 365, and cold data 375 into the multiple tiers of storage devices, respectively. For example, the first tier storage device 350 can store the hot data 355; the second tier storage device 360 can store the warm data 365; and the third-tier storage device 370 can store the cold data 375. In some embodiments, a single tier storage device can store one or more types of data, for example, based on the storage space and cost. For example, the first-tier storage device 350 can store the hot data 355 and some of the warm data 365, and the second-tier storage device 360 can store the rest of the warm data 375 and some of the cold data 375.

In some embodiments, each tier of the storage devices can store data log files including blockchain data generated by a blockchain-based ledger system (e.g., a distributed ledger system and/or blockchain-based centralized ledger system). For example, the first-tier storage device 350 can store a first data log file 390 including a first blockchain data generated by a blockchain-based ledger network, and the second-tier storage device 360 can store a second data log file 362 including a second blockchain data generated by the blockchain-based ledger system, and so on.

In some embodiments, blockchain data in a data log file that is stored on a relatively lower tier of the storage devices can be written at an earlier time than blockchain data in a data log file that is stored on a relatively higher tier of the storage devices. For example, the second blockchain data in the second data log file 362 that is stored on the second-tier storage device 360 can be written at an earlier time than the first blockchain data in the first data log file 390 that is stored on the first-tier storage device 350.

In some embodiments, the first-tier storage device 350 can further store one or more index log files 380 including index data indicating physical storage locations of the data in the data log files 390, 362, 364, 366, 372, 374, and 376 that are stored on the multiple tiers of storage devices 350, 360, and 370. For example, as shown in FIG. 3, the first-tier storage device 350 can store index log files 380 including index data indicating physical storage locations of the blockchain data in data log files 390 that are stored in the first-tier storage device 350, the data log files 362, 364, and 366 that are stored in the second-tier storage device 360, and the data log files 372, 374, and 376 that are stored in the third-tier storage device 370.

In some embodiments, one or more index log files can be stored in one or more of the second-tier storage device 360 or the third-tier storage device 370.

In some embodiments, the index log files and the data log files that are stored on the multi-tier storage subsystem 320 are append-only log files. In some embodiments, the blockchain data that are stored in the data log files can include block data, transaction data, and history state data.

In some embodiments, a higher-tier storage device can store a data log file including blockchain data that is migrated from a lower-tier storage device. For example, the first-tier storage device can store a data log file including blockchain data that is accessed more frequently than blockchain data in data log files in a second-tier storage device and that was migrated from the second-tier storage device.

In some embodiments, the storage system 300 can further include a distributed storage system 340 which includes storage medium such as non-volatile memory express (NVME), SSD, hard disk drive (HDD), and shingled magnetic recording (SMR). In some embodiments, the distributed storage system 340 can be generated, or expanded, by a client node of the blockchain-based ledger system for better availability, partition tolerance, flexibility, and cost. For example, the distributed storage system 340 can allow scaling by adding more servers or storage nodes and thus increasing capacity and performance linearly. It can use standard servers, drives, and network, which are less expensive. In some embodiments, the distributed storage system 340 can increase the utilization of standard servers, which consequently result in less power consumption, better cooling efficiency, better space usage, less maintenance cost, etc.

The front-end I/O subsystem 310 can perform write operations on blockchain data and generate the index log files 380 and the data log files 390, 362, 364, 366, 372, 374, and 376 stored on the multi-tier storage subsystem 320. Over time data stored on the multi-tier storage subsystem 320 can accumulate and agglomerate and may degrade the performance of the log-structured storage system 300. The back-end data management subsystem 330 can process and reorganize the data according to different needs, for example, to improve performance and reduce the cost of the log-structured storage system 300. In some embodiments, the back-end data management subsystem 330 can manage the data independently from the front-end I/O subsystem 310. For example, the back-end data management subsystem 330 can perform data management operations such as tiering, compressing, erasure coding, state snapshot, compaction, and verification on the back end on sealed or read-only index log files and data log files. In some embodiments, the back-end data management subsystem 330 can implement flow-control to minimize the impact on front-end I/O processing of the front-end I/O subsystem 310.

In some embodiments, tasks of the back-end data management subsystem 330 can include a rewrite of stored data and a replacement of an index corresponding to the rewritten data. In some embodiments, the back-end data management subsystem 330 can automatically determine on the back end whether a data log file needs to be rewritten. In some embodiments, the back-end data management subsystem 330 can determine a placement of the rewrite based on a configuration, such as tiering, compressing, and erasure coding. In some embodiments, the back-end data management subsystem 330 can read data from one or more source data log files, and rewrite the data to a destination data log file. In some embodiments, when a rewrite is completed, the back-end data management subsystem 330 can set the destination data log file to a sealed or immutable state and generate a corresponding destination index log file. In some embodiments, the destination index log file can include a list of data log files that can be safely deleted, and the data log files to which the destination index log file refers. In some embodiments, the back-end data management subsystem 330 does not recycle old data log files that can still be used by a live instance of the front-end I/O subsystem 310.

In some embodiments, the back-end data management subsystem 330 can process read-only index log files and corresponding read-only data log files that are generated according to the I/O operations of the front-end I/O subsystem 310. In some embodiments, the back-end data management subsystem 330 can analyze the index log files and determine, for example, a hot, warm, or cold level of data, a data volume, a garbage ratio, and/or a fragmentation amount. In some embodiments, based on the garbage ratio, disk usage rate, and/or system request, the back-end data management subsystem 330 can perform one or more of the following tasks:

(1) Data tiering. For example, when the storage medium usage rate is close to a safety upper limit, data may need to be migrated to a storage medium media in a next or lower tier storage device.

(2) Data compression. For example, when the storage medium usage rate is close to a safety upper limit, data file may need to be compressed.

(3) Erasure coding (EC). For example, when the storage medium usage rate is close to a safety upper limit, storage space may need to be released by erasure coding.

(4) State snapshot. For example, a snapshot of the state of the blockchain can be performed when there is a status modification (e.g., reclaiming storage space after data deletion).

(5) Data compaction. For example, garbage or fragments may need to be cleaned if garbage or fragments in the data log files grow to a size so as to obviously affect the performance of the log-structured storage system 300.

(6) Verification. For example, a cyclic redundancy check (CRC) of data on the storage medium can be performed regularly or on demand.

Data Tiering:

In some embodiments, for write request that require a relatively higher performance, the write requests can be written to a faster storage device (e.g., SSD cloud disks, ESSD cloud disks, NVME, etc.) among multiple different storage devices. For write requests that require a relatively lower performance in exchange of a lower expense, the write requests can be written to a storage device medium (e.g., NAS, etc.). In some embodiments, the back-end data management subsystem 330 can use a set of mixed slow and fast storage devices for data tiering and data migration. For example, a new block data generated by a blockchain network can have a relatively higher access frequency than an old block data, and the new block data can be stored in a faster storage device. In some embodiments, a portion of the new block data with the highest access frequency can be stored in a memory cache (e.g., memory cache 313) and/or a disk cache of a high speed (e.g., block cache 317).

In some embodiments, distributed ledger systems and blockchain-based centralized ledger systems both have strong hot and cold characteristics, which make them suitable for tiering storage. For example, a tiered storage system such as the multi-tier storage subsystem 320 can be used to include one or more of the following features: (1) combination of fast storage media with relatively small storage space and slow storage media with large storage space improve space usage without compromising performance; (2) supports for cold migration (e.g., cold data automatically migrates from fast media to slow media) and warm up (e.g., data migrates from slow media to fast media); (3) scalability to reduce maintenance cost when scale increases; (4) support for flexible configuration based on user needs; (5) supports for multi-media storage pools; or (6) fast migration to new storage media.

Figure 4:
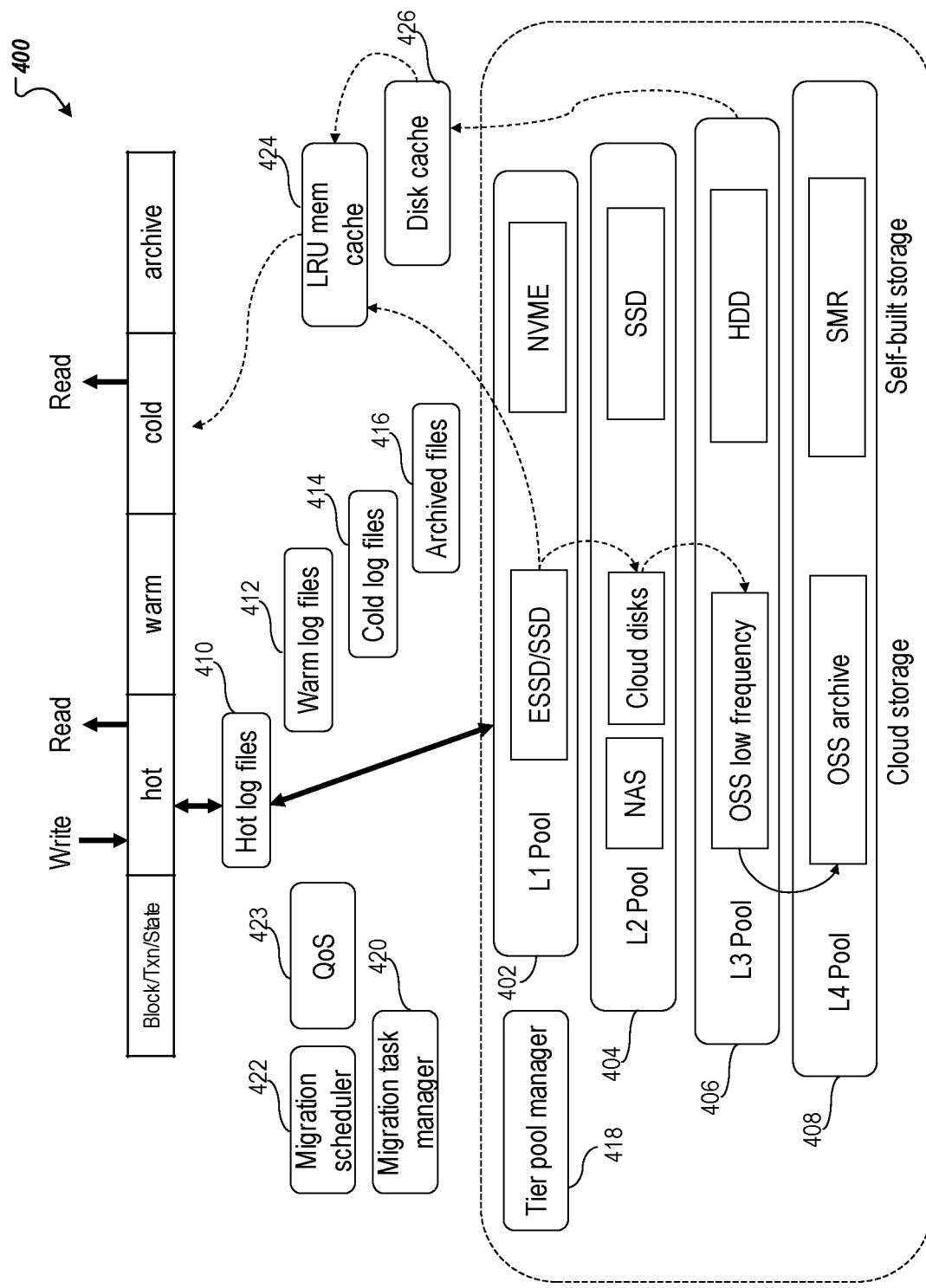
FIG. 4 is diagram illustrating an example of a tiered storage system in accordance with embodiments of this specification.

FIG. 4 is a diagram illustrating an example of a tiered storage system 400 in accordance with embodiments of this specification. In some embodiments, a tiered storage system can include multiple levels or tiers of storage devices, for example, based on access speeds of the storage devices. For example, referring to FIG. 4, the multiple storage devices for tiering can be divided into four tiers or levels including hot, warm, cold, and archive for storing log files based on their hot and cold characteristics. For example, the storage devices of the tiered storage system 400 can be divided into four tiers or levels for storing hot log files 410, warm log files 412, cold log files 414, and archived files 416, respectively.

In some embodiments, each tier or level of the storage device can be regarded as a virtual pool, and each pool can support multiple physical or virtual file systems (also referred to as storage devices). For example, the tiered storage system 400 can include a first-level pool 402, a second-level pool 404, and third-level pool 406, and a fourth level pool 408. In some embodiments, the file systems supported in the pools can include one or more of the following short-term file systems: cloud disk (e.g., virtual machine (VM)'s block device mounted to ext4/xfs file system); NAS (e.g., nfs file system, with a posix interface); OSS low frequency (suitable for formats like virtual file system, software development kit (SDK) system, representational state transfer (REST) interface, etc.); and OSS archive (suitable for formats like virtual file system, SDK system, REST interface, etc.).

For example, as shown in FIG. 4, the first-level pool 402 can include ESSD and SSD devices of a cloud storage system (e.g., multi-tier storage subsystem 320) that store hot log files 410. The second-level pool 404 can include NAS devices and cloud disks of the cloud storage system that store warm log files 412. The third-level pool 406 can include OSS low frequency devices of the cloud storage system that store cold log files 414. The fourth-level pool 408 can include OSS archive devices of the cloud storage system that store archived files 416.

In some embodiments, the file systems can further include long-term file systems such as a self-built distributed system (e.g., distributive storage system 340 built by a client node of the blockchain-based ledger system). For example, the first-level pool 402 can further include NVME devices of a distributed storage system generated by a client node of the blockchain network (e.g., as part of the distributive storage system 340) that store hot log files 410. The second-level pool 404 can further include SSD devices of the distributed storage system that store warm log files 412. The third-level pool 406 can further include HDD devices of the distributed storage system that store cold log files 414. The fourth-level pool 408 can further include SMR devices of the distributed storage system that store archived files 416. In some embodiments, all file systems can be provided with a unified interface with the overall log-structured storage system 300.

In some embodiments, the tiered storage system 400 can include one or more subsystems or components such as (1) a tier pool manager 418, (2) a migration task manager 420, (3) a migration scheduler 422 for managing data tiering, or (4) a quality of service (QoS) manager 423. In some embodiments, each of the managers can include any suitable computing elements (e.g., one or more of a processor, a memory, etc.) to perform functions as described herein. For example, these managers can manage data flows between the multiple storage devices of different performance and costs, for example, by leveraging differences in performance and cost among different storage devices to improve performance and efficacy of the overall log-structured storage system.

In some embodiments, the tier pool manager 418 can be configured to manage each tier of the storage devices. In some embodiments, the tier pool manager 418 can perform one or more of the following functions: manage storage space and pressure for multiple tiers of storage devices; provide file creation, deletion, and statistics analysis functions for a specified tier (e.g., select a storage device to create a data log file according to a system request); maintain a tier file mapping table that indicates correspondence of data files w.r.t., their storage locations in respective tiers of storage devices, and hotness or coldness of the data files, etc.

In some embodiments, the migration task manager 420 can manage the bidirectional data migration task between different storage devices, manage task lifecycles, callback results, perform statistics analyses, execute migration tasks, and so on.

In some embodiments, the migration scheduler 422 can support pluggable migration policies, manage data migration strategies, and provide data create/query/update/delete interfaces. In some embodiments, the migration scheduler 422 can perform scheduling management for migration tasks to achieve effective flow control of the migration tasks. In some embodiments, the migration scheduler 422 can grade or otherwise assign respective scores of the data log files on back end, and generate migration tasks of the data log files according to score ranking and a migration strategy. In some embodiments, the data log files can be graded according to a scoring formula that takes into consideration the tiers of the storage devices, access frequency, original data creation time, migration costs, and/or other factors. In some embodiments, the migration scheduler 422 can work with other subsystems or components of the tiered storage system 400 to quickly verify different migration strategies.

In some embodiments, data migration can be automatically performed according to predetermined data migration policies. For example, different data in high-speed storage devices can be graded according a predetermined scoring scheme, and migrated to low-speed devices on back end based on respective scores of the different data to release cache space. In some embodiments, some data in low-speed devices can be determined as hot data in some applications. The hot data can be first saved in disk cache, and migrated to high-speed devices if a score of the data log file meets a requirement. In some embodiments, after migration of a data file from a source storage device to a destination storage device, the original data may or may not be deleted in the source storage device. For example, if the destination storage device is a top-tier storage device, the data log file in disk cache does not need to be deleted, but can be allowed to be replaced by other data automatically.

In some embodiments, the QoS manager 423 can be configured to manage data flow or other performance metrics of the tiered storage system 400 to improve QoS. For example, in some instances, a burst of I/O writes to high-speed storage devices can result in high occupation or usage of the high-speed storage devices in higher tiers. In some embodiments, the QoS manager 423 can control the flow of the incoming data to the storage pool with high usage level (e.g., 85% or another threshold) in order to avoid the storage pool being filled up too quickly). The flow control can prevent the tiered storage system 400 from performance deterioration and can free up storage space for data migration. In order to improve the efficiency of data migration while reducing the impact on the front-end I/O operations (e.g., by the front-end I/O subsystem 310), flow control data migration can be performed on the back end (e.g., by the back-end data management subsystem 330). In some embodiments, the migration speed can be positively correlated with a usage level of a storage device. For example, if the usage level of a storage device is low, the flow control can be decreased in order to avoid excessive impact on the front end I/O. If the usage level of the storage device is high, the flow control can be lifted to accelerate data migration.

In some instances, the usage of the high-speed storage devices can be full, and the front-end I/O operations can be severely limited. In some embodiments, data can be written directly to a lower-tier storage device, without migrating the data from a higher-tier storage device to the lower-tier storage device. For example, if the first-tier storage device 350 in FIG. 3 is full or reaches a usage threshold, data can be directly written to the second-tier storage device 360. In some embodiments, data of a large size (e.g., with a size larger than a threshold) like blockchain block data can be directly written to a data log file in a low-tier storage device to save the cost due to data migration.

In some embodiments, in order to further reduce consumption of network resources, hard disk throughput, storage space and other resources due to data migration and to reduce the impact on the front-end I/O operations, compression and erasure coding can be performed by default when data is migrated to low-tier storage devices.

Low-speed or archived storage devices have relatively poor performance compared to high-speed storage devices. Generally most data is eventually written to the low-speed layer of storage devices. Caching hot data on high-speed storage devices and migrating the hot data to high-speed storage devices according to the data's hot and cold characteristics facilitates reading performance. In some embodiments, two or more types of caches can be implemented to improve reading performance: (1) memory cache (e.g., least recently used (LRU) cache 424); and (2) fast disk cache (e.g., least frequently used (LFU) disk cache 426 on high-speed storage devices). In some embodiments, a total size of the memory cache 424 can be dynamically configured, for example, in terms of hundreds of MB to several GB. Similarly, a total size of the fast disk cache can be dynamically configured, for example, in terms of 1 GB to tens of GB.

In some embodiments, some historic data that have been frequently accessed, such as a genesis block of a blockchain, can be placed in the LFU cache of a fast storage device.

Data Compression:

For both distributed ledger systems and blockchain-based centralized ledger systems, compression of the data block can effectively reduce the cost and improve the performance of a log-structured storage system. The log structure can facilitate the compression in the log-structured storage system due to its intrinsic characteristics and features.

In some embodiments, data written on the front end may not be compressed and can be directly written to a high-speed storage device (e.g., SSD cloud disk), for example, by appending the data in a data log file. In some embodiments, the data log file can be set to immutable when it reaches a certain size. In some embodiments, the back-end data management subsystem 330 can compress an original data log file on the back end, and replace the original data log file with the compressed data file. As such, impact of the compression operation on the front I/O operations can be reduced or minimized since the compression operation is performed on the back end.

Generally, effectiveness of compression and read amplification may need to be considered and balanced in determining a compression size or volume of the data log file. For example, in some instances, if the compression size or volume of the data log file is too small (e.g., less than 4 KB), space saved due to compression can be limited and the compression performance may be sub-optimal. On the other hand, if the compression size or volume of the data log file is too large, read amplification can become larger as well (e.g., to read a transaction entry, the entire compressed data log file that includes the transaction entry needs to be decompressed first). In some embodiments, a compression size of the data log file can be set to 16 KB-128 KB.

In some embodiments, the compressed data log file can include a number of records, where each record can include a compression header and a compressed data body. In some embodiments, metadata of the compressed data can include version information, compression algorithm, length, and CRC, etc.

For encrypted data, randomness of the encryption itself can make a performance of the data compression less than ideal. Therefore, in some embodiments, for data that needs to be encrypted (such as in trusted execution environment (TEE)), data can be compressed before encryption or after decryption.

In some embodiments, for compressed log files, the base index map may encode the physical data size of the compressed log files, modify and record corresponding indexes, and record file IDs of the log files, offset of the log files, and compressed data size of the log files.

Erasure Coding

In some embodiments, the back-end data management subsystem 330 can perform erasure coding on data in the data log files. For example, the back-end data management subsystem 330 can write the incoming data to a data log file with erasure coding on the back end.

For distributed ledger systems, in order to achieve a byzantine fault-tolerant log file layer between consensus nodes of the blockchain network, erasure coding can be performed to reduce the amount of cold data stored on each consensus node of the distributed ledger systems. For example, for 4 consensus nodes, 4 copies of data may be written before erasure coding. After erasure coding (e.g., 8+3 erasure coding scheme), the 4 nodes can store less than 2 copies of data (e.g., 1.375 copy of data).

For blockchain-based centralized ledger systems, the centralized structure does not require data redundancy resulting from backups of multiple nodes. In some embodiments, erasure coding can be performed in a tiered storage system in the blockchain-based centralized ledger systems to reduce a data redundancy, for example, in data backup in top-tier storage devices or a distributive storage system.

Data Compaction

In some embodiments, transaction data, block data, and history state data are append-only, and cannot be deleted or overwritten, so compaction is not performed on these data. In some embodiments, current state data can be processed using data compaction. Data compaction generally includes garbage collection and data defragmentation.

In some embodiments, the back-end data management subsystem 330 can sort the data log files according to their respective garbage ratios and arrange them in a descending ordering from high to low garbage ratios. In some embodiments, the back-end data management subsystem 330 can rewrite data log files with a relatively high garbage ratio. For example, the back-end data management subsystem 330 can rewrite data log files with a garbage ratio exceeding a predetermined threshold. In some embodiments, the earlier a data log file was created, the more likely it is that the data in the data log file has been overwritten, which means that the garbage ratio of older data log files can be higher than that of new data log files.

In some embodiments, the back-end data management subsystem 330 can implement a garbage recycle mechanism that can set a maximum data volume for each rewrite. In some embodiments, multiple recycle procedures can be performed, for example, in parallel by multiple live-instance streams of the front-end I/O subsystem 310 to improve the overall efficiency of garbage collection.

In some embodiments, the live-instance streams of the front-end I/O subsystem 310 can obtain garbage ratio and report the obtained garbage ratio to the back-end data management subsystem 330, and the back-end data management subsystem 330 can determine an appropriate or optimal stream to rewrite the data.

Defragmentation is generally a process of locating the noncontiguous fragments of data stored on storage devices, and rearranging the fragments and restoring them into fewer fragments or into a whole file. Defragmentation can reduce data access time and allow storage to be used more efficiently. In some embodiments, the back-end data management subsystem 330 can perform defragmentation periodically, from time to time, or upon request.

In some embodiments, for some types of data such as world state data or state object data, the key of these data has a certain level of hash characteristics. If the key has a prefix (e.g., different state objects have different prefixes), performing compaction on such data by putting the data into a same file or adjacent files can improve read performance.

State Snapshot

A state snapshot can capture a state of a system (e.g., a distributive ledger system) at a particular point in time. In some embodiments, the back-end data management subsystem 330 can perform a state snapshot operation to generate and store state data of the log-structured storage system 300. In some embodiments, the state data can include history state data and current state data. The history state data can include historical states of the distributive ledger system for backtracking, and the current state data can include the most recent state data of the distributive ledger system. The history state data can grow larger in size and take up a lot of storage space as time goes by. In some embodiments, in order to improve historical data backtracking and storage space usage, the back-end data management subsystem 330 can perform snapshot operations on the current state data.

The log-structured design of the log-structured storage system 300 can facilitate snapshot operations and improve the performance and efficiency of the log-structured storage system 300. In some embodiments, the snapshot operations can be performed based on redirect on write (ROW) method, which provides a high efficient index for the data set corresponding to the snapshot.

In some embodiments, the snapshot function of the log-structured storage system 300 can support flash creation (e.g., at a level of a second) and rollback, which may only have a limited or minimum impact on front end I/O operations. In some embodiment, the back-end data management subsystem 330 can create hard links of data log files and index log files to avoid data copy.

In some embodiments, when data from a write request is stored to a data log file, a record can be generated to include a snapshot identifier (ID) indicating a snapshot version. In some embodiments, the back-end data management subsystem 330 can perform one or more of the following operations in response to receiving a state snapshot request:

(1) write an operation log (op log) corresponding to snapshot creation;

(2) increase the snapshot version by 1;

(3) write all new snapshot write requests to a new in-memory delta index map (redirect);

(4) after all write requests that are associated with an old snapshot are completed, flush the index to the current index log file, perform compaction on all index files, merge the index files to a single index log file, and set the merged single index log file to a sealed state (the data log file is also sealed during the compaction process);

(5) create a new index file base on the new snapshot version; and (6) create a directory corresponding to the snapshot, and create a hard link for data log files and index log files that are associated with the snapshot to the directory.

In some embodiments, the back-end data management subsystem 330 can perform compaction on the back end to recover snapshots that are deleted.

In some embodiments, if a snapshot upload is required, a data structure (such as a bitmap with 1 bit represents a data range) can be maintained for the snapshots. For example, in the index log files that were created when creating a snapshot, a bitmap corresponding to the snapshot can be set to all 0s. After receiving a write request, the bitmap can be updated to 1, indicating the data was modified in this snapshot version.

In some embodiments, a snapshot version number can correspond to an index log file, which indicates write requests corresponding to all the indexes in the index log file.

Verification

In some embodiments, the back-end data management subsystem 330 can perform CRC check to the data that are recorded in the log files. In some embodiments, the back-end data management subsystem 330 can perform CRC check periodically, from time to time, or upon request.

In some embodiments, when an index file generated by the back-end data management subsystem 330 is imported to a live-instance stream of the front-end I/O subsystem 310, an in-memory index map of the live-instance stream can be newer than the index file generated by the back-end data management subsystem 330 and can include the location information of new and old data blocks. In some embodiments, the live-instance stream can traverse the in-memory base map, replace the corresponding index entries, and then generate a new index log file that has no reference to the old data log file. Then, the live-instance stream can safely delete the old data log file and index log file.

In some embodiments, in the log-structured storage framework (e.g., log-structured storage system 300), a stream can be used to operate as a processing engine, component, unit, or module for processing I/O requests. Each stream can be adapted to different business scenarios through different configurations. In some embodiments, a stream can be implemented by one or more processors coupled with software to execute operations such as managing data log file, index log file, manifest file, request queue, etc. In some embodiments, a live stream can refer to a live instance that handles front end I/O operations of the front-end I/O subsystem 310. In some embodiments, there can be a corresponding dredger stream that manages data written by the live stream in the back end by the back-end data management subsystem 330.

In some embodiments, a stream can include a management interface that allows different configurations for different operations, such as, snapshot, statistics, and fault recovery, for different types of data. For example, streams for processing the block data, state data, and transaction data can adopt different configurations according to the respective characteristics of the block data, state data, and transaction data. For example, the stream corresponding to the block can be configured to have tiering and/or compression functions, but not compact, snapshot, or table functions.

In some embodiments, different types of data can be processed by respectively customized or otherwise configured streams. For example, a request to write a block can be processed by a stream corresponding to the block.

In some embodiments, multiple streams can be combined into a bundle to provide flexible implementations suitable for a specific application of a distributed ledger system and/or a blockchain-based centralized ledger system. The described techniques can support services in a distributed ledger system (e.g., blockchain networks), a blockchain-based centralized ledger system, or both. In some embodiments, the two types of systems can have different streams that are customized or otherwise configured according to the needs of the two types of the log-structured storage systems 300. For example, a distributed ledger system can have four types of data: transaction consensus log, block, status, and index. Accordingly, four types of streams can be configured to process the four types of data, respectively. A blockchain-based centralized ledger system can have three types of data: transactions, blocks, and indexes, without state (or complex contract state). Accordingly, three types of streams can be configured to process the three types of data, respectively.

In some embodiments, each type of stream can be configured respectively to process different types of data. For example, blocks, transaction consensus logs, indexes do not require snapshot. Accordingly, the streams for processing blocks, transaction consensus logs, and indexes do not need to be configured with a snapshot function. On the other hand, streams for status data can be configured with the snapshot function. As another example, index data is relatively small, but it needs good performance and does not require tiering hierarchical storage. Long-term operations and large amounts of block data may need tiering hierarchical storage, shared storage, and erasure coding.

In some embodiments, distributed ledger systems and blockchain-based centralized ledger systems can have different requirements on the streams for performing operations such as tiering, compression, erasure coding, state snapshot, compaction, and data verification, etc.

Table 1 provides an example of the configurations for different scenarios. As shown, "both" means that an operation on a certain type of data can be performed for both the distributed ledger systems and the blockchain-based centralized ledger systems. "DLS" means that an operation on a certain type of data can be performed only for the distributed ledger systems. "None" means that an operation on a certain type of data can be performed for neither the distributed ledger systems nor the blockchain-based centralized ledger systems.

TABLE 1

| Items | Transaction | Block | Current state | History state | Extra | Consensus log |
|---|---|---|---|---|---|---|
| Tiering | Both | Both | DLS | DLS | None | None |
| Compressing | Both | Both | DLS | DLS | None | None |
| Erasure coding | DLS | DLS | DLS | DLS | None | None |
| Snapshot | None | None | DLS | None | None | None |
| Compaction | None | None | DLS | None | None | DLS |
| Verification | Both | Both | Both | Both | Both | none |

For example, as shown in Table 1, tiering operation can be performed on transaction data and/or block data for both the distributed ledger systems and the blockchain-based centralized ledger systems. Tiering operation can be performed on current state data and/or history state only for the distributed ledger systems. Snapshot operations can be performed on the transaction data for neither the distributed ledger systems nor the blockchain-based centralized ledger systems.

In some embodiments, the log-structured storage system adopts a multi-threading full asynchronous mechanism based on one-queue one-loop per thread and concurrency, which provides an efficient asynchronous mode and convenient concurrency synchronous programming mode. In some embodiments, different streams can process different types of data in parallel. For example, a stream configured for block data can write block data into a data log file allocated to store block data, while a stream configured for transaction data can read certain request transaction data from a data log file that includes the transaction data.

Figure 5:
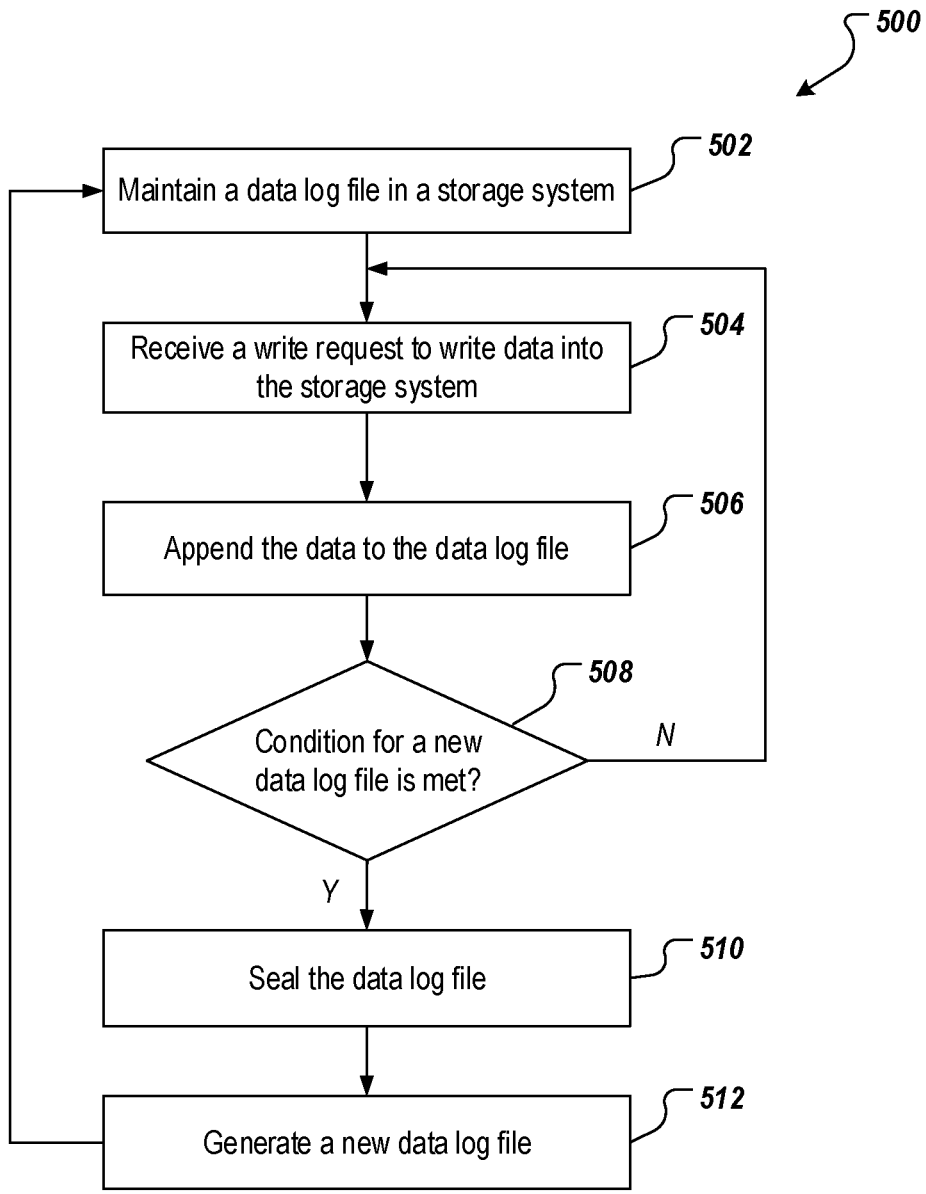
FIG. 5 is a flowchart illustrating an example of a process for performing a write operation of a log-structured storage system, in accordance with embodiments of this specification.

FIG. 5 is a flowchart illustrating a process 500 for performing a write operation of a log-structured storage system, in accordance with embodiments of this specification. In some embodiments, some or all operations of the process 500 can be an example of a write procedure performed by a front-end I/O subsystem (e.g., front-end I/O subsystem 310 of FIG. 3). For convenience, the process 500 will be described as being performed by the front-end I/O subsystem 310 of FIG. 3. However, the process 500 can be performed by a system of one or more computers, located in one or more locations, and programmed appropriately in accordance with this specification. For example, a data processing and storage system (e.g., the log-structured storage system 300 of FIG. 3), appropriately programmed, can perform the process 500.

At 502, a data log file (e.g., data log files 390, 362, 364, 366, 372, 374, or 376) is maintained in a data storage system (e.g., log-structured storage system 300). In some embodiments, the data log file can store data including transaction data, block data, state data, and self-descriptive metadata. For example, the data log file can store blockchain data including block data, transaction data, and/or state data generated by a blockchain network. In some embodiments, metadata in the data log file can include metadata describing the data blocks, such as transaction hash values and sequence values, block hash values and block numbers, snapshot version numbers, cyclic redundancy check (CRC) code, encryption information, and so on. In some embodiments, one data log file stores a single type of the blockchain data so multiple types of the blockchain data do not mix up in a single data file. For example, the data storage system can maintain one or more of a data log file for transaction data, a data log file for block data, and a data log file for state data. In some embodiments, the data log file can be an append-only file. In some embodiments, the data log file does not store index information. In some embodiments, the data log file can be stored in a multi-tier storage subsystem (e.g., multi-tier storage subsystem 320).

At 504, a front-end I/O subsystem (e.g., front-end I/O subsystem 310) of the data storage system receives a write request to write data into the data storage system. In some embodiments, the front-end I/O subsystem 310 can process write operations including modifications to the data that are stored on the log-structured storage system 300. In some embodiments, modifications to the data are processed by the front-end I/O subsystem 310 so as to not overwrite the original data. Instead, the modifications can be processed by adding or appending data to the data log files in a log form.

At 506, the front-end I/O subsystem 310 appends data to the data log file. In some embodiments, the data log file can be continuously updated based on data write or append operations. In some embodiments, the data log file can have a configurable maximum length between 512 MB and 2 GB, or another size depending on needs or applications of the storage system.

At 508, the front-end I/O subsystem 310 determines whether a condition for generating a new data log file is met. In some embodiments, the front-end I/O subsystem 310 can determine whether the data log file has reached a predetermined maximum length or size. If it is determined that the data log file has reached a predetermined maximum length or size, the front-end I/O subsystem 310 can determine that the condition for generating a new data log file is met. If it is determined that the condition for generating a new data log file is met, the process proceeds to step 510. If it is determined that the condition for generating a new data log file is not met, the process proceeds back to step 504.

At 510, the front-end I/O subsystem 310 seals the data log file if it is determined that the condition for generating a new data log file is met. In some embodiments, the front-end I/O subsystem 310 can set the data log file to be a sealed, immutable, or read-only state if it is determined that the condition for generating a new data log file is met (e.g., the data log file has reached the maximum length or size).

At 512, the front-end I/O subsystem 310 generates a new data log file. In some embodiments, the new data log file can be also append-only and stored in the multi-tier storage subsystem 320.

In some embodiments, the front-end I/O subsystem 310 can determine a type of the data (e.g., transaction data, block data, state data) requested to be written in the write request. In response to the determination, the front-end I/O subsystem 310 appends the data to a data log file corresponding to the type of the data. In some embodiments, the front-end I/O subsystem 310 can use a respective processing engine corresponding to the type of the data to perform some or all of the process 500.

For example, in response to determining the data is transaction data, the front-end I/O subsystem 310 uses a processing engine specified for processing the transaction data to append the data to the data log file for transaction data. In some embodiments, in response to determining the data is block data, the front-end I/O subsystem 310 uses a processing engine specified for processing the block data to append the data to the data log file for block data. In some embodiments, in response to determining the data is state data, the front-end I/O subsystem 310 uses a processing engine specified for processing the state data to append the data to the data log file for state data.

Figure 6:
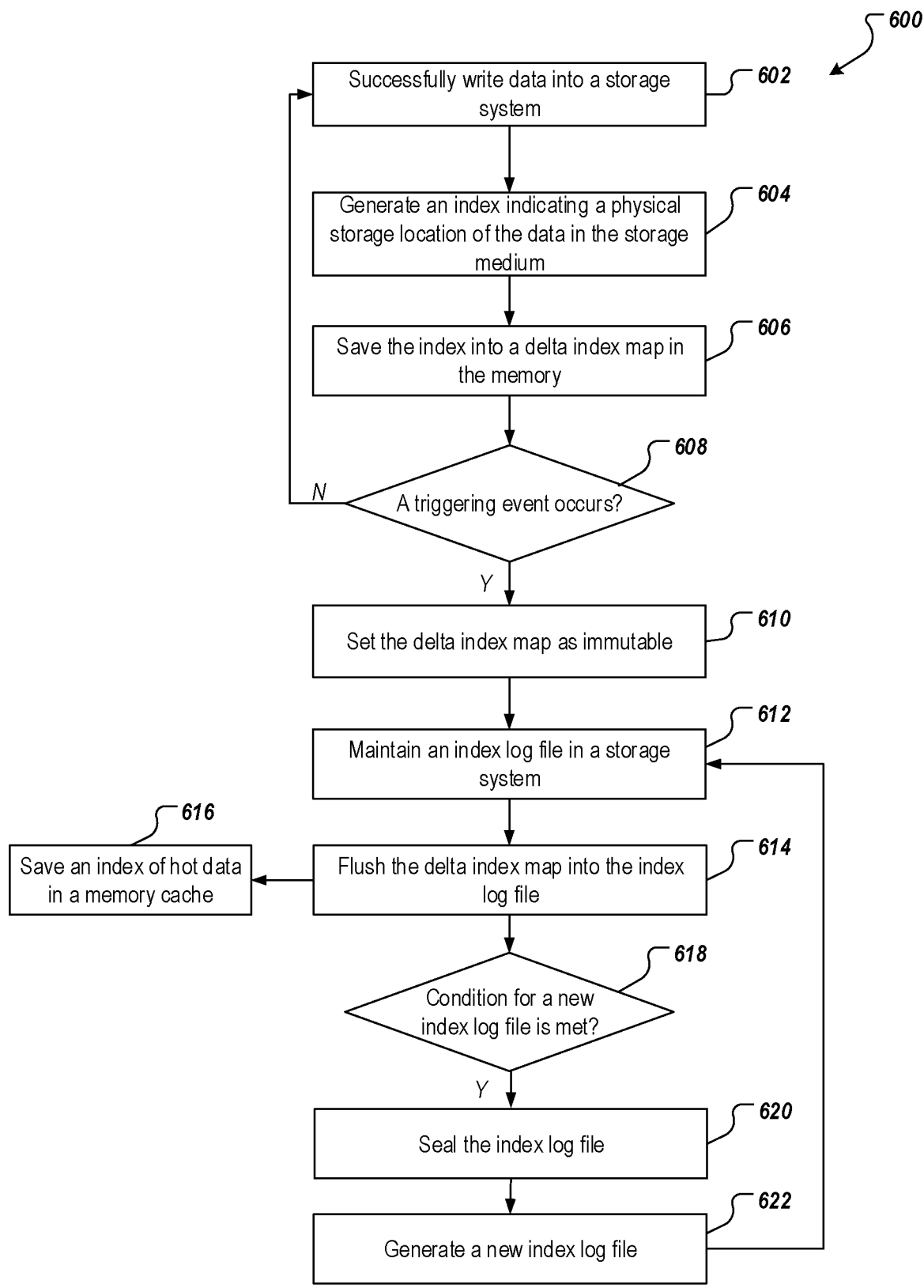
FIG. 6 is a flowchart illustrating an example of a process for generating index in connection with a write operation of a log-structured storage system, in accordance with embodiments of this specification.

FIG. 6 is a flowchart illustrating a process 600 for generating index in connection with a write operation of a log-structured storage system, in accordance with embodiments of this specification. In some embodiments, some or all operations of the process 600 can be an example of a write procedure performed by a front-end I/O subsystem (e.g., front-end I/O subsystem 310 of FIG. 3). For convenience, the process 600 will be described as being performed by the front-end I/O subsystem 310 of FIG. 3. However, the process 600 can be performed by a system of one or more computers, located in one or more locations, and programmed appropriately in accordance with this specification. For example, a data processing and storage system (e.g., the log-structured storage system 300 of FIG. 3), appropriately programmed, can perform the process 600.

At 602, data has been successfully written to a storage system (e.g., log-structured storage system 300). In some embodiments, a front-end I/O subsystem (e.g., front-end I/O subsystem 310) of the data storage system can write data blocks to data log files that are stored in a multi-tier storage subsystem (e.g., multi-tier storage subsystem 320) of the data storage system.

At 604, the front-end I/O subsystem 310 generates an index indicating a physical storage location of the data in the log-structured storage system 300. In some embodiments, the index data can include an index indicating a correspondence from a block hash to a block number, an index indicating a correspondence from a block hash to a storage location, an index indicating a correspondence from a transaction hash to a transaction, and an index indicating a correspondence from a receipt hash to a receipt. In some embodiments, index data for a blockchain-based centralized ledger system can include an index indicating a correspondence from a sequence to a transaction storage location, and an index indicating a correspondence from a timing sequence to a transaction hash.

At 606, the front-end I/O subsystem saves the index into a delta index map (e.g., delta index map 312) in a memory (e.g., memory 315) of the front-end I/O subsystem 310. In some embodiments, the front-end I/O subsystem 310 can include multiple in-memory index maps that are stored in the memory 315. In some embodiments, the in-memory index map can be divided into read-only base index map 316 and read-write delta index map 312. In some embodiments, the base index map 316 can store indexes of cold data (e.g., old data and/or less frequently accessed data) and the delta index map 312 can store indexes of newly written data.

At 608, the front-end I/O subsystem 310 determines whether a triggering event occurs. The trigger event can include one or more events leading to sealing the current delta index map and generating a new delta index map. The trigger event can include, for example, the size of the current delta index map reaches a threshold, a memory usage of the memory 315 meets a threshold, or a specified time arrives (e.g., the log-structured storage system 300 may seal the delta index map on a regular basis). If it is determined that the triggering event occurs, the process proceeds to step 610. If it is determined that the triggering event does not occur, the process proceeds back to step 602.

At 610, the front-end I/O subsystem 310 sets the delta index map 312 as immutable if it is determined that the triggering event occurs. In some embodiments, the front-end I/O subsystem can set the delta index maps 312 in the memory 315 to immutable index maps 314, flush them to an index log file (e.g., index log file 380), and create a new delta index map 312 to receive indexes generated according to new write requests.

At 612, an index log file 380 is maintained in the storage system 300. In some embodiments, index of newly written transaction data and block data can be added to the index maps 312 and 316 and index log files 390, but index of existing transaction data and block data may not be modified. In some embodiments, the index log file 390 can be stored in the multi-tier storage subsystem 320 along with the data log files.

At 614, the front-end I/O subsystem 310 flushes the delta index map 312 into the index log file 380, for example, to release the memory used by the delta index map 312. In some embodiments, the front-end I/O subsystem 310 can create a new delta index map 312 to receive indexes generated according to new requests. In some embodiments, the front-end I/O subsystem 310 can combine the delta index map 312 and the base index map 316 and generate a new base index map 316 and flush the generated base index map 316 to the index log file 380.

In some embodiment, at 616, the front-end I/O subsystem 310 saves an index of hot data in a memory cache (e.g., memory cache 313). For example, if certain data is determined as hot data that has a probability of frequent accesses, the index of the data can be saved into the memory cache to improve the read speed.

At 618, the front-end I/O subsystem 310 determines whether a condition for generating a new index log file 380 is met. In some embodiment, the condition for generating a new index log file can include a maximum length or size of the index log file 380. In some embodiments, the condition for generating a new index log file 380 can include a number of batches of write operations performed by the front-end I/O subsystem. For example, in some embodiments, the index log file 380 can be updated by processing the indexes of the write operations in batches. In some embodiments, when an index log file 380 has been updated for a certain number of batches of the write operations, the index log file 380 can be sealed or set to read-only, and a new index log file 380 can be created to write new data. If it is determined that the condition for generating a new index log file 380 is met, the process proceeds to step 620.

At 620, the front-end I/O subsystem 310 seals the index log file 380 if it is determined that the condition for generating a new index log file 380 is met. For example, the index log file 380 can be sealed or set to read-only when the index log file 380 has reached a maximum length or size, or has been updated for a certain number of batches of the write operations.

At 622, the front-end I/O subsystem 310 generates a new index log file 380 to store subsequent index data after sealing the old index log file 380.

Figure 7:
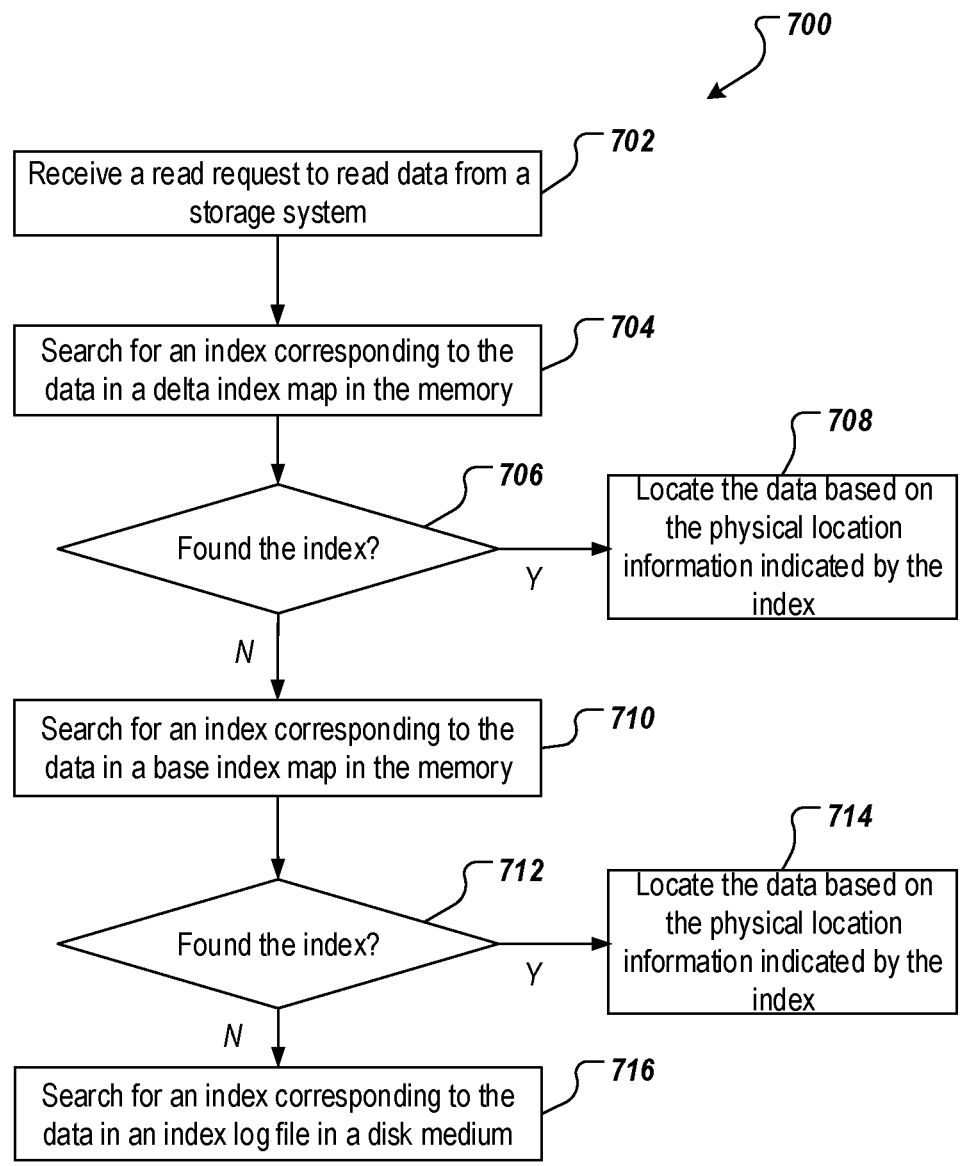
FIG. 7 is a flowchart illustrating an example of a process for performing a read operation of a log-structured storage system, in accordance with embodiments of this specification.

FIG. 7 is a flowchart illustrating a process 700 for performing a read operation of a log-structured storage system, in accordance with embodiments of this specification. In some embodiments, some or all operations of the process 700 can be an example of a read procedure performed by a front-end I/O system (e.g., front-end I/O subsystem 310 of FIG. 3). For convenience, the process 700 will be described as being performed by the front-end I/O subsystem 310. However, the process 700 can be performed by a system of one or more computers, located in one or more locations, and programmed appropriately in accordance with this specification. For example, a data processing and storage system (e.g., the log-structured storage system 300 of FIG. 3), appropriately programmed, can perform the process 700.

At 702, a front-end I/O system (e.g., front-end I/O subsystem 310) of a storage system (e.g., log-structured storage system 300) receives a read request to read data from the storage system.

At 704, the front-end I/O system 310 searches for an index corresponding to the data in a delta index map (e.g., delta index map 312) in a memory (e.g., memory 315) of the front-end I/O system 310. In some embodiments, the index corresponding to the data can include physical location information of the data. In some embodiments, the memory 315 of the front-end I/O subsystem 310 can store multiple in-memory index maps including read-only base index map 316 and read-write delta index map 312.

At 706, the front-end I/O system 310 determines whether the index corresponding to the data is found in the delta index map 312. If the index corresponding to the data is found in the delta index map 312, the process proceeds to step 708 wherein the front-end I/O system 310 can locate the data based on the physical location indicated by the index. If the index corresponding to the data is not found in the delta index map 312, the process proceeds to step 710.

At 710, the front-end I/O system 310 searches for an index corresponding to the data in the base index map 316 in the memory 315 if it is determined that the index corresponding to the data is not found in the delta index map 312.

At 712, the front-end I/O system 310 determines whether the index corresponding to the data is found in the base index map 316. If it is determined that the index corresponding to the data is found in the base index map 316, the process proceeds to step 714 where the front-end I/O system 310 locates the data based on the physical location information indicated by the index. If it is determined that the index corresponding to the data is not found in the base index map 316, the process proceeds to step 716.

At 716, the front-end I/O system 310 searches for an index corresponding to the data in an index log file (e.g., index log file 380) in a disk storage device if it is determined that the index corresponding to the data is not found in the base index map 316. For example, the front-end I/O system 310 can search for an index corresponding to the data in an index log file 380 stored in a multi-tier storage subsystem (e.g., multi-tier storage subsystem 320) of the storage system 300.

In some embodiments, the front-end I/O subsystem 310 can determine a type of the data (e.g., transaction data, block data, state data) requested to be read in the read request. In response to the determination, the front-end I/O subsystem 310 can use a respective processing engine corresponding to the type of the data to perform some or all of the process 700.

Figure 8:
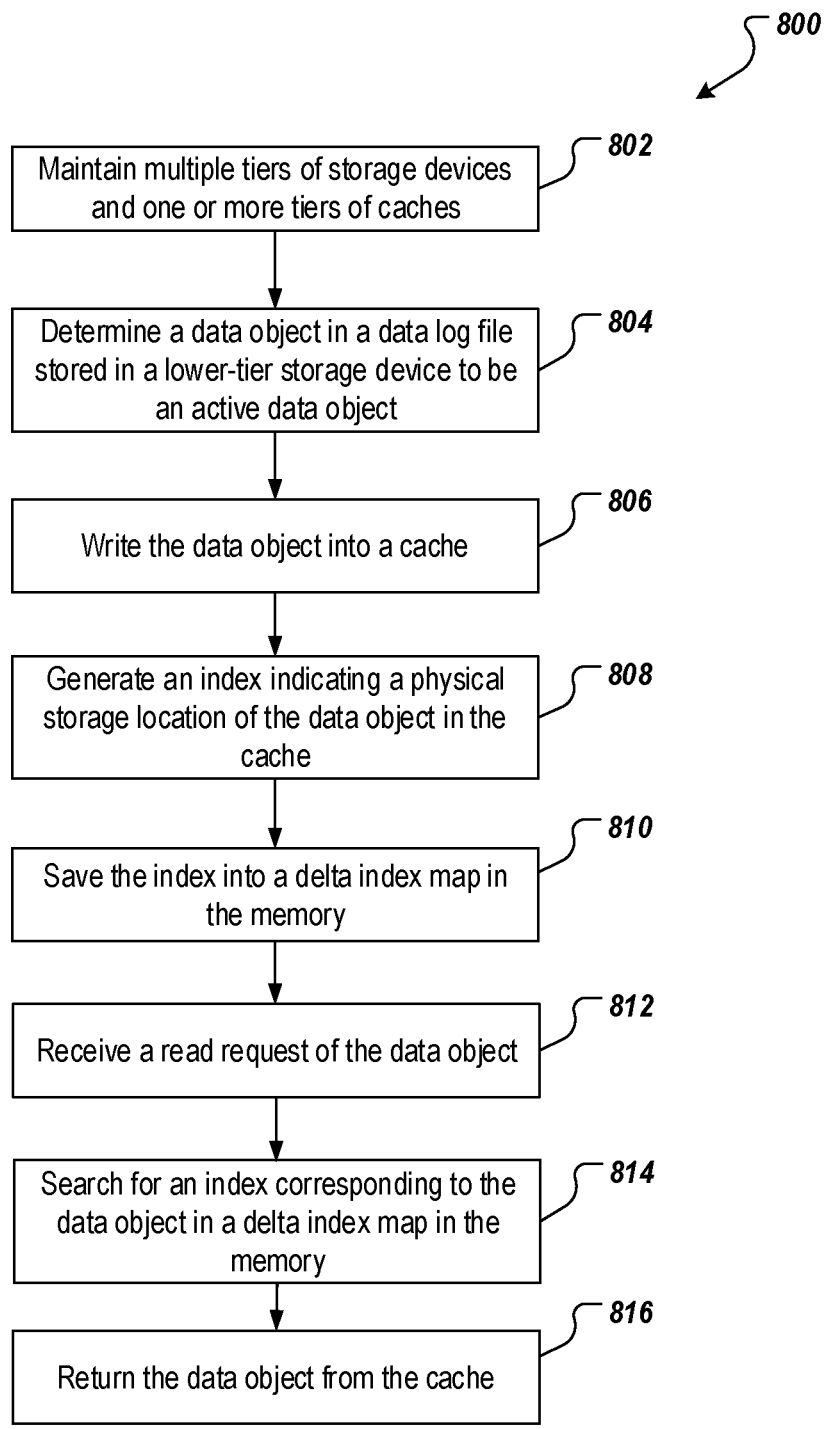
FIG. 8 is a flowchart illustrating an example of a process for improving a read operation of a log-structured storage system, in accordance with embodiments of this specification.

FIG. 8 is a flowchart illustrating a process 800 for improving a read operation of a log-structured storage system, in accordance with embodiments of this specification. In some embodiments, some or all operations of the process 800 can be an example of an I/O operation performed by a log-structured storage system (e.g., log-structured storage system 300 of FIG. 3). For convenience, the process 800 will be described as being performed by the log-structured storage system 300. However, the process 800 can be performed by a system of one or more computers, located in one or more locations, and programmed appropriately in accordance with this specification. For example, a data processing and storage system, appropriately programmed, can perform the process 800.

At 802, a storage system (e.g., log-structured storage system 300 or tiered storage system 400) maintains multiple tiers of storage devices (e.g., storage devices 350, 360, and 370 of multi-tier storage subsystem 320) and one or more tiers of caches (e.g., memory cache 313 and block cache 317). In some embodiments, the multiple tiers of storage devices are layered in a hierarchical structure based on one or more performance characteristics (e.g., an access speed, an access bandwidth, or an access latency). For example, the multiple tiers of storage devices can include a number of storage devices that have different access speeds, and store data with different characteristics. For example, a first tier storage device can store blockchain data that is more frequently accessed than blockchain data stored in a second tier storage device.

At 804, a data object in a data log file (e.g., data log files 362, 364, 366, 372, 374, 376, 390) stored in a lower-tier storage device (e.g., storage devices 350, 360, and 370) is determined to be an active data object, for example, by a front-end I/O subsystem (e.g., front-end I/O subsystem 310) or a back-end data management system (e.g., back-end data management subsystem 330 of the storage system 300). In some embodiments, the data object can include transaction data, block data, and state data. In some embodiments, the data object can be determined as an active data object based on one or more activeness or hotness policies, for example, if the data object have been recently accessed over a number of times (e.g., accessed over a number of time within a predetermined time window), or if the data object has been identified with a certain priority.

At 806, the data object is written into a cache (e.g., memory cache 313 and block cache 317). For example, the front-end I/O subsystem 310 can write the data object into a memory cache 313 or a disk block cache 317 of a high-speed storage medium.

At 808, an index indicating a physical storage location of the data object in the cache is generated. In some embodiments, the index data in the memory 315 can be organized using an LSM method.

At 810, the index can be saved into a delta index map (e.g., delta index map 312) in the memory 315. In some embodiments, the memory 315 can maintain multiple in-memory index maps including read-only base index map 316 and read-write delta index map 312. In some embodiments, the delta index map 312 can be configured to store indexes of data that are more frequently accessed and/or newer than indexes stored in the base index map 316.

At 812, the front-end I/O subsystem 310 receives a read request of the data object.

At 814, the front-end I/O subsystem 310 searches for an index corresponding to the data object in the delta index map 312 in the memory 315. In some embodiments, the front-end I/O subsystem 310 can search the delta index map 312 first. If the index is not found in the delta index map 312, the front-end I/O subsystem 310 can subsequently search the base index map 316 for the index corresponding to the data.

At 816, the front-end I/O subsystem 310 returns the data object from the cache, which can provide faster access to the requested data object compared to cases where the requested data object needs to be fetched from a next cache level, a main memory, or a lower-tier of storage device in the multi-tier storage subsystem 320. For example, if the front-end I/O subsystem 310 successfully identifies the index corresponding to the data in the delta index map 312 or the base index map 316, the front-end I/O subsystem 310 can use the index to identify the physical location of the data in the cache and retrieve the data from the cache.

In some embodiments, the front-end I/O subsystem 310 can determine a type of the data (e.g., transaction data, block data, state data) requested to be read in the read request. In response to the determination, the front-end I/O subsystem 310 can use a respective processing engine corresponding to the type of the data to perform some or all of the process 800.

Figure 9:
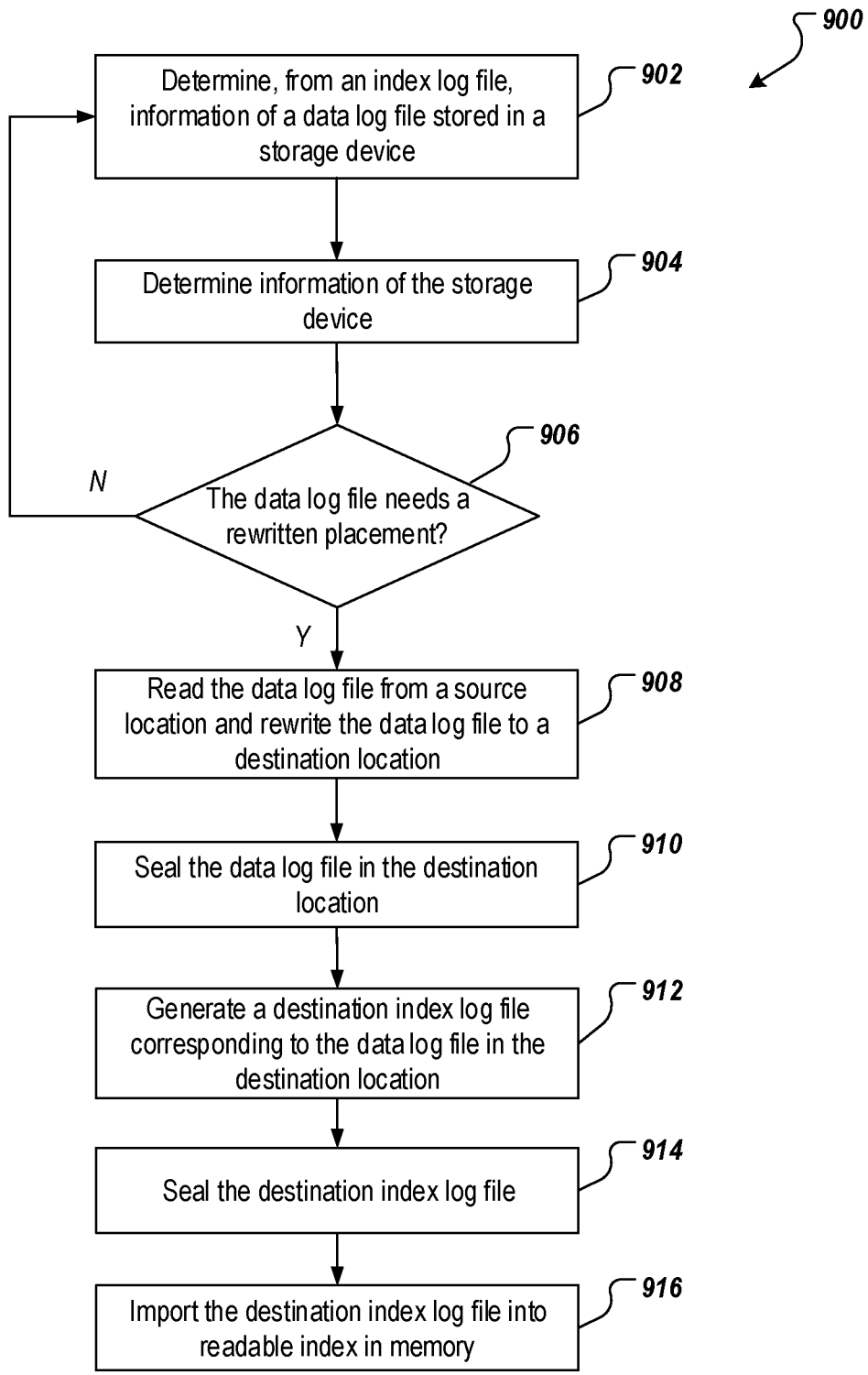
FIG. 9 is a flowchart illustrating an example of a process for managing data log files stored in a log-structured storage system, in accordance with embodiments of this specification.

FIG. 9 is a flowchart illustrating a process 900 for managing data log files stored in a log-structured storage system, in accordance with embodiments of this specification. In some embodiments, some or all operations of the process 900 can be an example of a rewritten placement procedure performed by a back-end data management system of a log-structured storage system (e.g., back-end data management subsystem 330 of the log-structured storage system 300 of FIG. 3). For convenience, the process 900 will be described as being performed by the back-end data management subsystem 330. However, the process 900 can be performed by a system of one or more computers, located in one or more locations, and programmed appropriately in accordance with this specification. For example, a data processing and storage system (e.g., the log-structured storage system 300 of FIG. 3), appropriately programmed, can perform the process 900.

At 902, a back-end data management system (e.g., back-end data management subsystem 330) determines, from an index log file (e.g., index log file 380), information of a data log file (e.g., data log files 390, 362, 364, 366, 372, 374, and 376) stored in a storage device (e.g., storage devices 350, 360, and 370). In some embodiments, the information of the data log file in the storage device can include one or more of an activeness (e.g., an access frequency), a size, a garbage ratio, or a fragmentation level of the data log file.

At 904, the back-end data management system 330 determines information of the storage device. In some embodiments, the information of the storage device can include one or more of a usage, a garbage ratio, a fragmentation level, or an input/output (I/O) request of the storage device.

At 906, the back-end data management system 330 determines whether the data log file needs a rewritten placement. In some embodiments, the back-end data management subsystem 330 can determine the rewritten placement based on the information of the data log file stored in the storage device, and/or information of the storage device. In some embodiments, the rewritten placement can include at least one of tiering, compressing, erasure coding, state snapshot, compaction, or verification. If it is determined that the data log file needs a written replacement, the process proceeds to step 908. If it is determined that the data log file does not need a rewritten placement, the process proceeds back to step 902.

At 908, the back-end data management system 330 reads the data log file from a source location and rewrites the data log file to a destination location if it is determined that the data log file needs a rewritten placement.

At 910, the back-end data management system 330 seals the data log file in the destination location. For example, the back-end data management system 330 can set the data log file to a sealed state or read-only after the rewritten placement completes.

At 912, the back-end data management system 330 generates a destination index log file corresponding to the data log file in the destination location. In some embodiments, the destination index log file can include a list of data log files that can be safely deleted, and/or a list of data log files to which the destination index log file refers.

At 914, the back-end data management system 330 seals the destination index log file. For example, the back-end data management system 330 can set the destination index log file to as immutable or read-only.

At 916, the destination index log file is imported into a readable index map in memory. For example, the destination index log file can be imported to a delta index map or a base index map so that the data log file in the destination location can be addressed or read.

Figure 10:
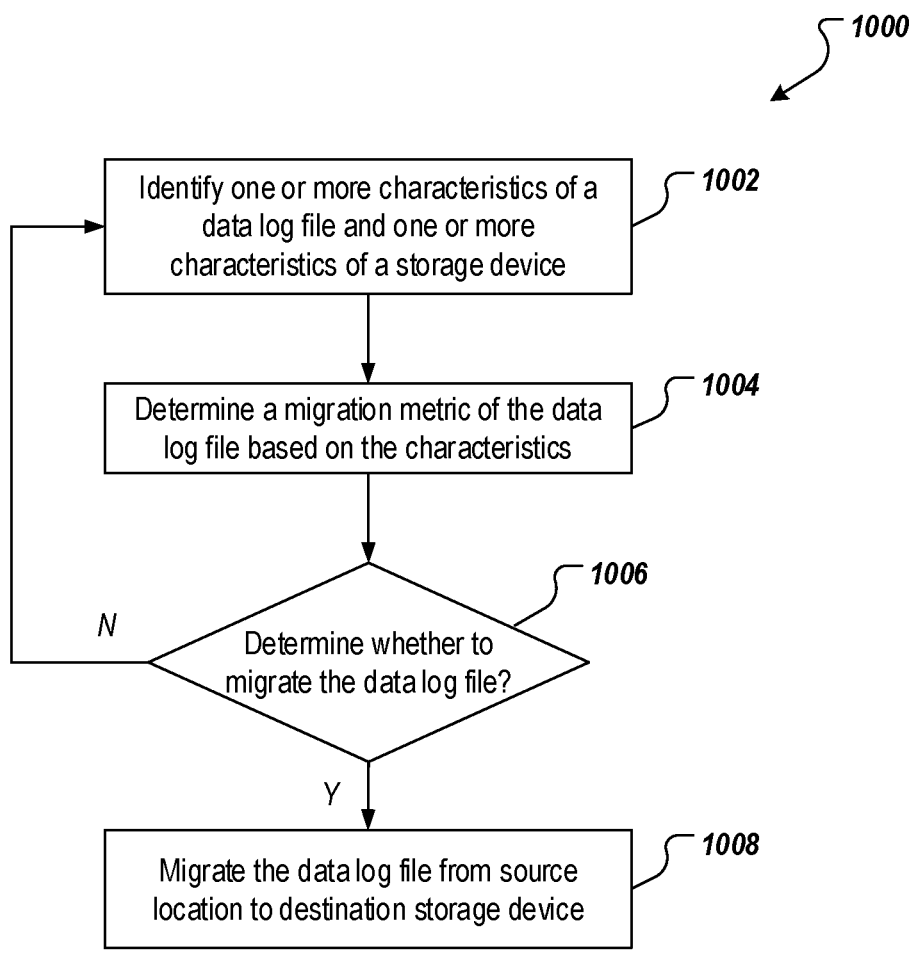
FIG. 10 is a flowchart illustrating an example of a process for performing data migration in a log-structured storage system, in accordance with embodiments of this specification.

FIG. 10 is a flowchart illustrating a process 1000 for performing data migration in a log-structured storage system, in accordance with embodiments of this specification. In some embodiments, some or all operations of the process 1000 can be an example of a tiering/migration procedure performed by a back-end data management system of a log-structured storage system (e.g., back-end data management subsystem 330 of the log-structured storage system 300 of FIG. 3). For convenience, the process 1000 will be described as being performed by the back-end data management subsystem 330. However, the process 1000 can be performed by a system of one or more computers, located in one or more locations, and programmed appropriately in accordance with this specification. For example, a data processing and storage system (e.g., the log-structured storage system 300 of FIG. 3), appropriately programmed, can perform the process 1000.

At 1002, a back-end data management system (e.g., back-end data management subsystem 330) identifies one or more characteristics of a data log file (e.g., data log files 390, 362, 364, 366, 372, 374, and 376) and one or more characteristics of a storage device (e.g., storage device 350, 360, and 370). In some embodiments, the one or more characteristics of the data log file can include a data type (e.g., block data, state data, and transaction data), a creation time, a data size, an activeness, a garbage ratio, or a fragmentation level of the data log file, etc. In some embodiments, the one or more characteristics of a storage device can include an access speed, an access bandwidth, an access latency, a usage, a garbage ratio, a fragmentation level, or an input/output (I/O) request of the storage device.

At 1004, the back-end data management system 330 determines a migration metric of the data log file based on the characteristics. In some embodiments, the back-end data management system 330 can assign scores to the data log files and generate migration tasks according to score ranking and predetermined migration strategies. In some embodiments, the data log files can be graded or assigned scores according to a scoring formula that takes into consideration the media level, access frequency, the original data creation time, and migration costs, etc.

At 1006, the back-end data management system 330 determines whether to migrate the data log file. For example, the data log file can be scored according to a predetermined scoring scheme. If a score of the data log file exceeds a predetermined threshold, the back-end data management system 330 can determine that the data log file needs to be migrated. If it is determined that the data log file needs to be migrated, the process proceeds to step 1008. If it is determined that the data log file does not need to be migrated, the process proceeds back to step 1002.

At 1008, the back-end data management system 330 migrates the data log file from a source location to a destination storage device if it is determined that data log file needs to be migrated. In some embodiments, data log files in high-speed storage devices can be graded according to a predetermined scoring scheme, and migrated to low-speed storage devices based on the scores (e.g., after sorting or ranking the scores of the data log files) to release storage space. In some embodiments, hot data in a data log file stored in a low-speed storage device can be saved in a disk cache first, and then migrated to a high-speed storage device if a score of the data log file meets a predetermined threshold.

Figure 11:
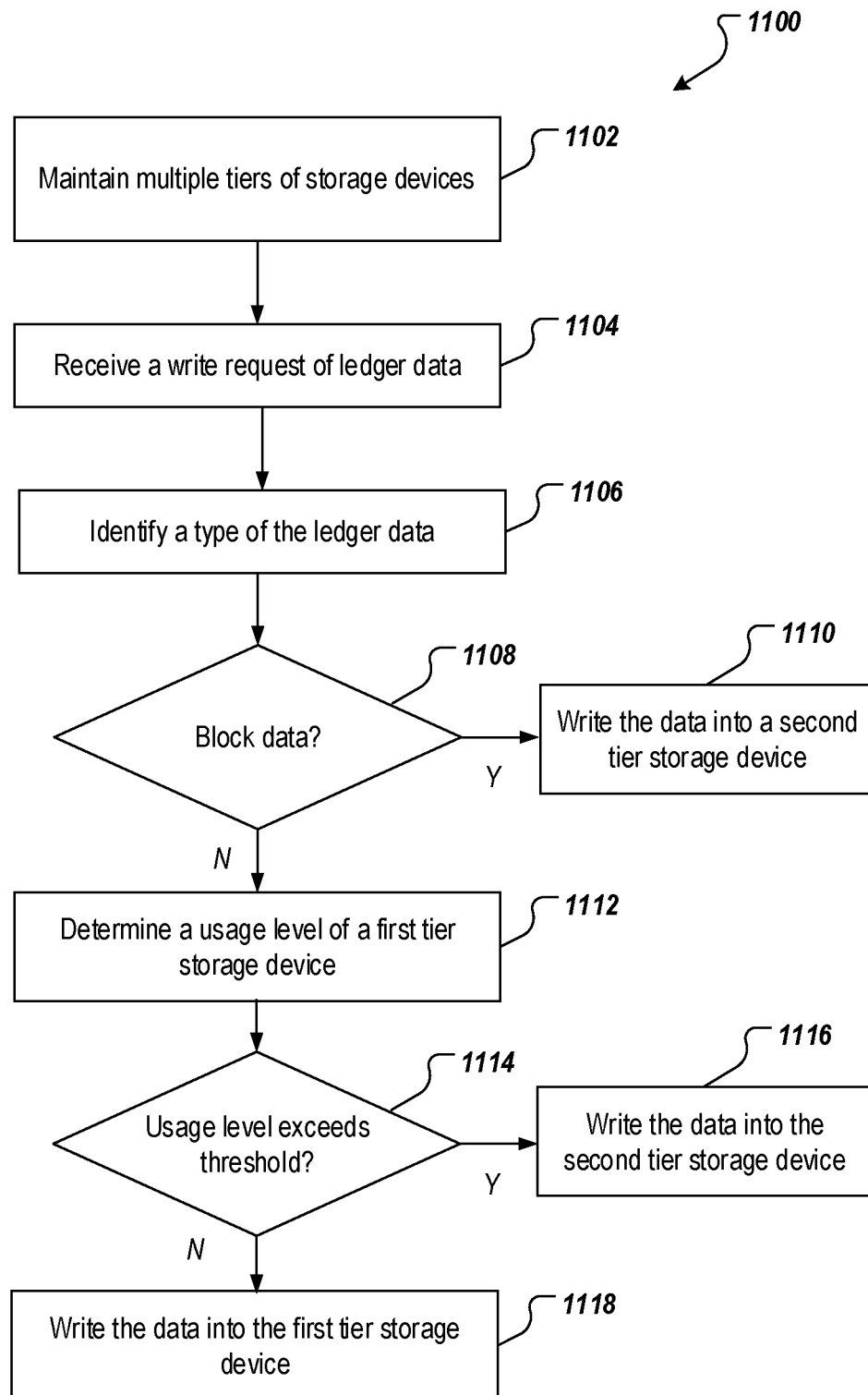
FIG. 11 is a flowchart illustrating an example of a process for performing data flow control in a log-structured storage system, in accordance with embodiments of this specification.

FIG. 11 is a flowchart illustrating a process 1100 for performing data flow control in a log-structured storage system, in accordance with embodiments of this specification. In some embodiments, some or all operations of the process 1100 can be an example of a flow control/optimization procedure performed by a log-structured storage system (e.g., log-structured storage system 300 of FIG. 3). For convenience, the process 1100 will be described as being performed by the log-structured storage system. However, the process 1100 can be performed by a system of one or more computers, located in one or more locations, and programmed appropriately in accordance with this specification. For example, a data processing and storage system, appropriately programmed, can perform the process 1100.

At 1102, a storage system (e.g., log-structured storage system 300) maintains multiple tiers of storage devices (e.g., storage devices 350, 360, and 370). In some embodiments, the multiple tiers of storage devices are layered in a hierarchical structure based on one or more performance characteristics (e.g., an access speed, an access bandwidth, or an access latency). For example, the multiple tiers of storage devices can include a number of storage devices that have different access speeds and can store data with respective characteristics (e.g., a first tier storage device can store blockchain data that is more frequently accessed than blockchain data stored in a second tier storage device).

In some embodiments, the log-structured storage system 300 can assign flow control strategies to the multiple tiers of storage device. For example, the log-structured storage system 300 can assign a first flow control strategy to the first tier storage device and a second flow control strategy to the second tier storage device based on one or more characteristics (e.g., an access speed, an access bandwidth, an access latency, a usage, a garbage ratio, a fragmentation level) of the first tier storage device and the second tier storage device. In some embodiments, the first flow control strategy can include one or more of: a first speed of writing data into the first tier storage device, or one or more first thresholds for adjusting the first speed of writing data into the first tier storage device, and the second flow control strategy can include one or more of: a second speed of writing data into the first tier storage device, or one or more second thresholds for adjusting the second speed of writing data into the second tier storage device At 1104, a write request of ledger data is received by the log-structured storage system 300. In some embodiments, the ledger data can include blockchain data such as transaction data, block data, and state data, etc.

At 1106, the log-structured storage system 300 identifies a type of the ledger data. For example, the back-end data management subsystem 330 can determine whether the ledger data is a transaction data, a block data, or a state data. At 1108, the log-structured storage system 300 determines whether the ledger data is block data. In some embodiments, block data has a larger size than another types of blockchain data (e.g., transaction data, state data, or index data) and may have more impact on the throughput of the I/O operations of the log-structured storage system 300. If it is determined that the ledger data is a block data, the process proceeds to step 1110 where the back-end data management subsystem 330 writes the data directly into a second tier storage device (e.g., storage device 360), and skipping a first tier storage device, for example, to save cost of performing a migration later. In some embodiments, the second tier storage device is at a lower tier than a first tier storage device. For example, the second tier storage device may have a lower access speed than the first second tier storage device. In some embodiments, the second tier storage device may have a lower cost than the first second tier storage device. In some embodiments, the second tier storage device may have a larger storage space than the first second tier storage device. If it is determined that the ledger data is not a block data, the process proceeds to step 1112.

At 1112, the log-structured storage system 300 determines a usage level of the first tier storage device if it is determined that the ledger data is a not block data.

At 1114, the log-structured storage system 300 determines whether the usage level reaches or exceeds a predetermined threshold. In some embodiments, the predetermined threshold is used to determine whether the first tier storage device is substantially full. For example, if it is determined that the usage level reaches or exceeds a threshold (e.g., 85%), the log-structured storage system 300 can determine that first tier storage device is substantially full. If it is determined that the usage level reaches or exceeds the predetermined threshold, the process proceeds to step 1116 where the data is written to the second tier storage device. If it is determined that the usage level is lower than the predetermined threshold, the process proceeds to step 1118.

At 1118, the log-structured storage system 300 writes the data into the first tier storage device is it is determined that the usage level is lower than the predetermined threshold.

In some embodiments, the log-structured storage system 300 can adjust a speed of writing data into the first tier storage device based on the usage level of the first tier storage device. For example, if it is determined that the usage level of the first tier storage device reaches or exceeds a first predetermined threshold (e.g., 65%), the log-structured storage system 300 can decrease a speed of writing data into the first tier storage device. In some embodiments, the log-structured storage system 300 can decrease the speed of writing data into the first tier storage device based on the usage level of the first tier storage device. In some embodiments, the log-structured storage system 300 can continuously decrease the speed of writing data into the first tier storage device as the usage level of the first tier storage device increases. For example, the log-structured storage system 300 can decrease the speed of writing data into the first tier storage device to a first rate (e.g., 500 MB/s) when the usage level of the first tier storage device is a first value (e.g., 70%), and decrease the speed of writing data into the first tier storage device to a second rate (e.g., 400 MB/s) that is lower than the first rate when the usage level of the first tier storage device is a second value (e.g., 75%) that is larger than the first value.

In some embodiments, the log-structured storage system 300 can increase the speed of writing data into the first tier storage device if it is determined that the usage level of the first tier storage device is below a second predetermined threshold (e.g., 35%). In some embodiments, the log-structured storage system 300 can increase the speed of writing data into the first tier storage device based on the usage level of the first tier storage device. In some embodiments, the log-structured storage system 300 can continuously increase the speed of writing data into the first tier storage device as the usage level of the first tier storage device decreases. For example, the log-structured storage system 300 can increase the speed of writing data into the first tier storage device to a third rate (e.g., 550 MB/s) when the usage level of the first tier storage device is a third value (e.g., 30%), and increase the speed of writing data into the first tier storage device to a fourth rate (e.g., 600 MB/s) that is higher than the third rate when the usage level of the first tier storage device is a fourth value (e.g., 20%) that is smaller than the third value.

Figure 12:
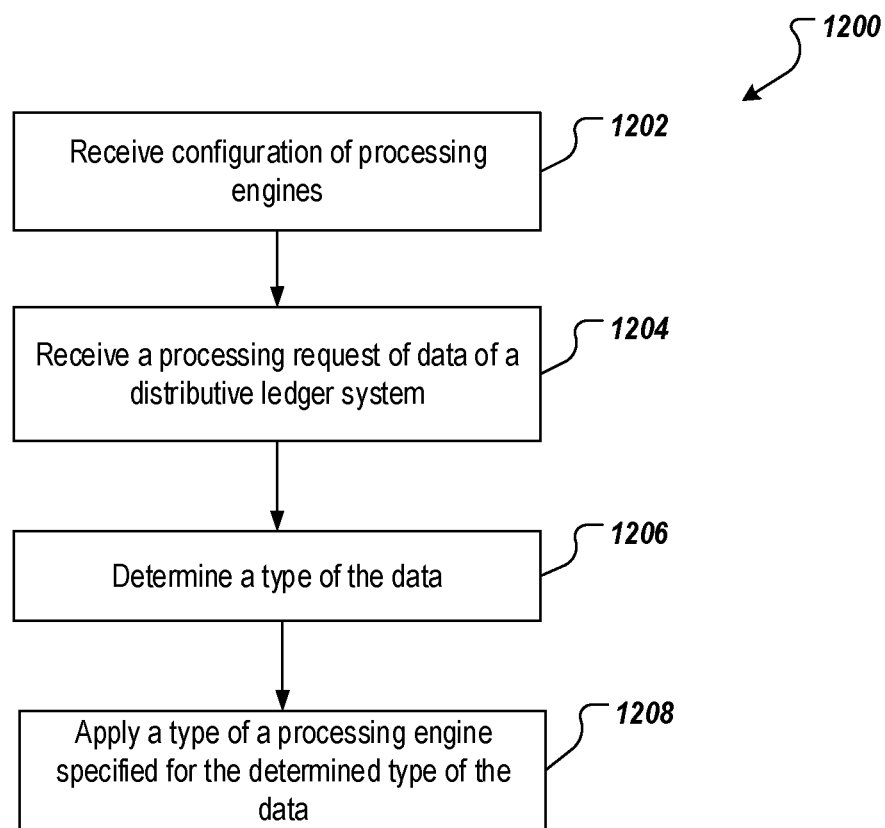
FIG. 12 is a flowchart illustrating an example of a process that can be executed in accordance with embodiments of this specification.

FIG. 12 is a flowchart illustrating a process 1200 that can be executed in accordance with embodiments of this specification. For convenience, the process 1200 will be described as being performed by the log-structured storage system 300 of FIG. 3. However, the process 1200 can be performed by a system of one or more computers, located in one or more locations, and programmed appropriately in accordance with this specification. For example, a data processing and storage system, appropriately programmed, can perform the process 1000.

At 1202, a storage system (e.g., log-structured storage system 300) receives configurations of a plurality of processing engines. In some embodiments, the configurations can configure a respective type of a processing engine for processing each of multiple types of data of a distributive ledger system according to a characteristic of the each of the types of the data, for example, according to Table 1. In some embodiments, the storage system 300 can include a type of a processing engine specified for processing block data; a type of a processing engine specified for processing transaction data; a type of a processing engine specified for processing state data; and a type of a processing engine specified for processing index data.

In some embodiments, the state data can include current state data and history state data, and the storage system 300 can include a type of a processing engine specified for processing the current state data and a type of a processing engine specified for processing the history state data.

At 1204, the storage system 300 receives a processing request of data of the distributive ledger system. In some embodiments, types of the data of the distributive ledger system can include block data, transaction data, state data, and index data.

In some embodiments, the storage system 300 can receive an I/O request of the data of the distributive ledger system. In some embodiments, the corresponding type of the processing engine specified for processing the type of the data of the distributive ledger system can include a corresponding type of an I/O processing engine specified for performing a read or write operation of the type of the data of the distributive ledger system.

In some embodiments, the storage system 300 can receive a data management request of the data of the distributive ledger system. In some embodiments, the corresponding type of the processing engine specified for processing the type of the data can include a corresponding type of a data management processing engine specified for performing a data management operation of the type of the data in the storage system. In some embodiments, the management operation comprises one or more of tiering, compaction, compression, erasure coding, or snapshot.

At 1206, the storage system 300 determines a type of the data among the types of the data of the distributive ledger system. In some embodiments, the type of the data can be block data or transaction data. In some embodiments, the type of the data can be state data.

At 1208, the storage system 300 applies a type of a processing engine specified for processing the type of the data. In some embodiments, the type of the processing engine specified for processing the type of the data can be configured with functions including tiering, erasure coding, and compression of the block data or transaction data in the storage system 300. In some embodiments, the type of the processing engine specified for processing the type of the data can be configured with functions including snapshot and compaction of the state data in the storage system 300.

Figure 13:
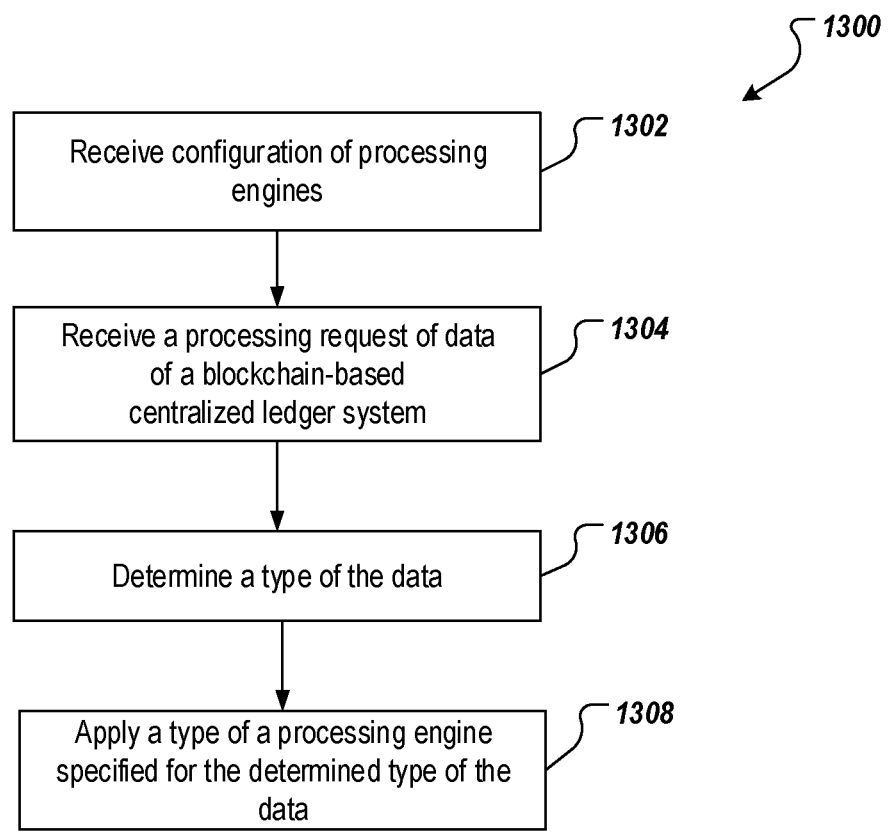
FIG. 13 is a flowchart illustrating an example of a process that can be executed in accordance with embodiments of this specification.

FIG. 13 is a flowchart illustrating a process 1300 that can be executed in accordance with embodiments of this specification. For convenience, the process 1300 will be described as being performed by the log-structured storage system 300 of FIG. 3. However, the process 1300 can be performed by a system of one or more computers, located in one or more locations, and programmed appropriately in accordance with this specification. For example, a data processing and storage system, appropriately programmed, can perform the process 1300.

At 1302, a storage system (e.g., log-structured storage system 300) receives configurations of a plurality of processing engines. In some embodiments, the configurations can configure a respective type of a processing engine for processing each of multiple types of data of a blockchain-based centralized ledger system according to a characteristic of the each of the types of the data, for example, according to Table 1.

In some embodiments, the storage system 300 can include a type of a processing engine specified for processing block data; a type of a processing engine specified for processing transaction data; and a type of a processing engine specified for processing index data.

At 1304, the storage system 300 receives a processing request of data of a blockchain-based centralized ledger system. In some embodiments, types of the data of the blockchain-based centralized ledger system can include block data, transaction data, and index data.

In some embodiments, the storage system 300 receives an I/O request of the data of the blockchain-based centralized ledger system. In some embodiments, the corresponding type of the processing engine specified for processing the type of the data of the blockchain-based centralized ledger system can include a corresponding type of an I/O processing engine specified for performing a read or write operation of the type of the data of the blockchain-based centralized ledger system, for example, according to some or all operations of the processes 500, 600, 700, 1100, and 1400.

In some embodiments, the storage system 300 can receive a data management request of the data of the blockchain-based centralized ledger system. In some embodiments, the corresponding type of the processing engine specified for processing the type of the data can include a corresponding type of a data management processing engine specified for performing a data management operation of the type of the data in the storage system. In some embodiments, the management operation can include one or more of tiering, compaction, compression, erasure coding, or snapshot.

At 1306, the storage system 300 determines a type of the data among the types of the data of the blockchain-based centralized ledger system. In some embodiments, the type of the data can be block data or transaction data.

At 1308, the storage system 300 applies a type of a processing engine specified for processing the type of the data according to a characteristic of the type of the data. In some embodiments, the type of the processing engine specified for processing the type of the data can be configured with functions including tiering, erasure coding, and compression of the block data or transaction data in the storage system. In some embodiments, the storage system 300 applies a type of a processing engine specified for processing the type of the data according to some or all operations of the processes 800, 900, 1000 and 1400.

Figure 14:
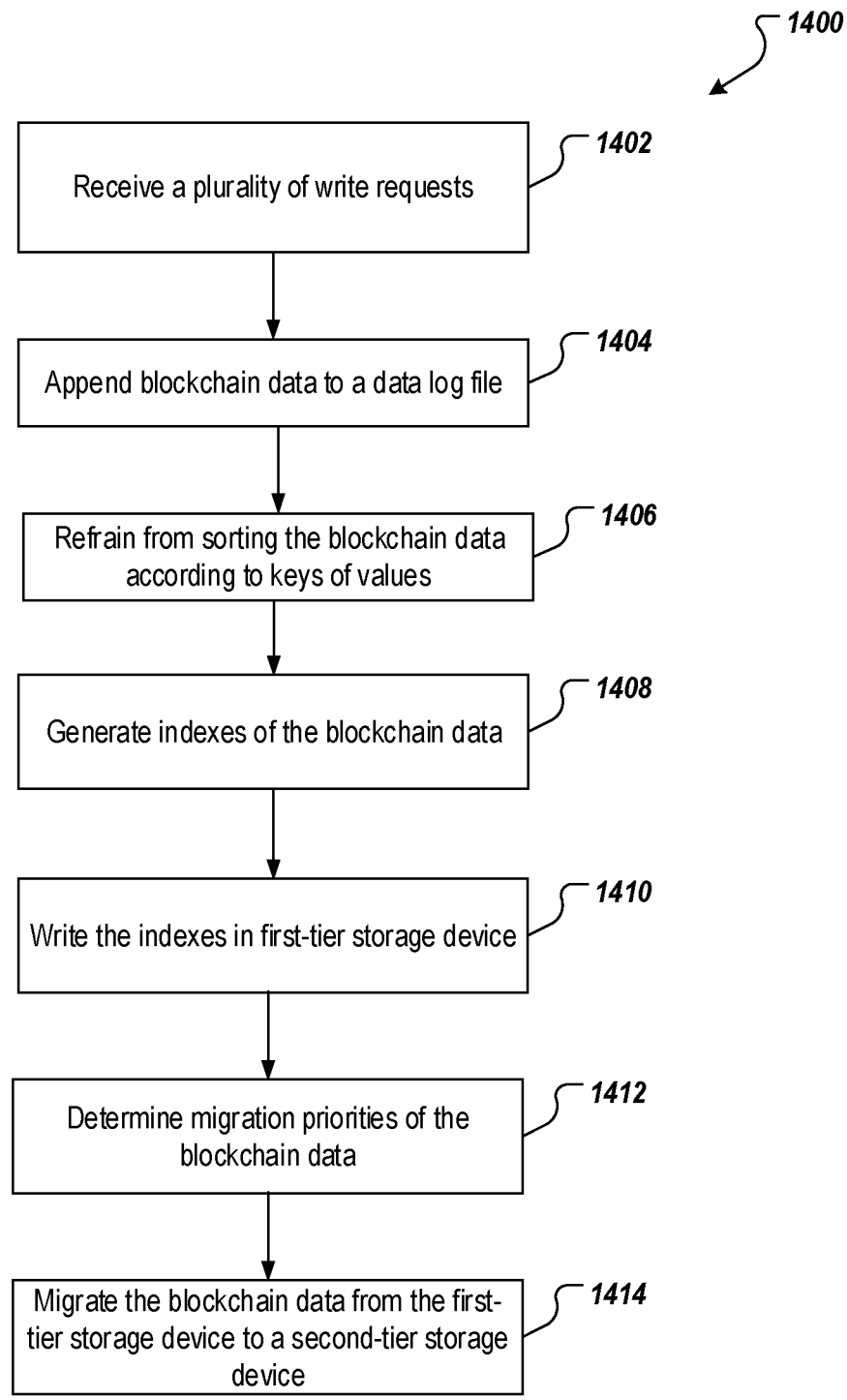
FIG. 14 is a flowchart illustrating an example of a process that can be executed in accordance with embodiments of this specification.

FIG. 14 is a flowchart illustrating a process 1400 that can be executed in accordance with embodiments of this specification. For convenience, the process 1400 will be described as being performed by the log-structured storage system 300 of FIG. 3. However, the process 1400 can be performed by a system of one or more computers, located in one or more locations, and programmed appropriately in accordance with this specification. For example, a data processing and storage system, appropriately programmed, can perform the process 1400.

At 1402, a storage system (e.g., log-structured storage system 300) receives a plurality of write requests for storing a respective plurality of blockchain data in the storage system. In some embodiments, each of the plurality of the blockchain data can include a value of one or more of a block, a transaction, or a state of a blockchain network, and a key corresponding to the value. In some embodiments, the key can include a hash value corresponding to the value.

At 1404, the storage system 300 appends the plurality of the blockchain data to a data log file (e.g., data log files 390, 362, 364, 366, 372, 374, and 376) according to a chronological order of the plurality of the blockchain data. For example, later received blockchain data will be appended to earlier received data that has been stored in the data log file. In some embodiments, the data log file can be an append-only file. In some embodiments, the data log file can be stored in a first-tier storage device (e.g., storage devices 350) in a multi-tier storage subsystem (e.g., multi-tier storage subsystem 320) of the log-structured storage system 300 that includes a plurality of tiers of storage devices, and the first-tier storage device has a highest access speed among the plurality of tiers of storage devices.

At 1406, the log-structured storage system 300 refrains from sorting the plurality of the blockchain data in the data log file according to any other metrics, for example according to respective keys of values (e.g., in KVPs) in the plurality of the blockchain data. In some embodiments, unlike existing storage system that will rearrange the plurality of the blockchain data in the data log file according to respective keys of values in the plurality of the blockchain data, the plurality of the blockchain data in the data log file of the log-structured storage system 300 are arranged according to the time that the plurality of the blockchain data are generated or received by the log-structured storage system 300. At 1408, the log-structured storage system 300 generates indexes indicating respective physical storage locations of the plurality of the blockchain data in the data log file, for example, according to corresponding operations of the process 600.

At 1410, the log-structured storage system 300 writes the indexes in the first-tier storage device, for example, according to corresponding operations of the process 600.

At 1412, the log-structured storage system 300 determines respective migration priorities, scores or metrics of the plurality of the blockchain data, for example, according to corresponding operations of the process 1000. In some embodiments, the log-structured storage system 300 determines respective migration priorities according to the chronological order of the plurality of the blockchain data. In some embodiments, the migration priority of older blockchain data can be higher than a migration priority of newer blockchain data.

At 1414, the log-structured storage system 300 migrates the plurality of the blockchain data stored in the first-tier storage device into a second-tier storage device (e.g., storage device 360) according to the respective migration priorities. In some embodiments, the second-tier storage device can have a lower access speed than the first-tier storage device.

Figure 15:
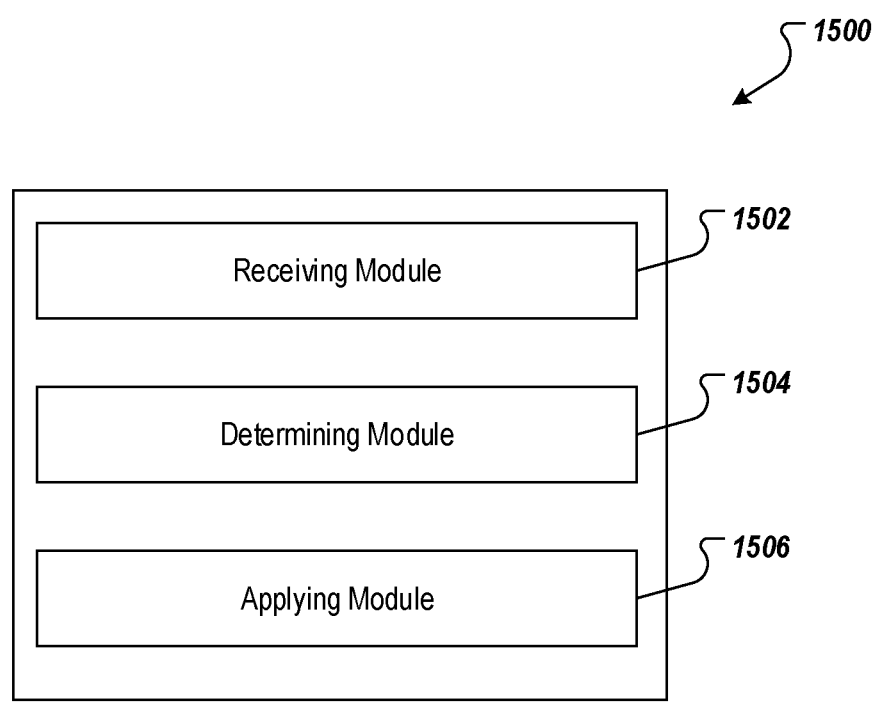
FIG. 15 is a diagram illustrating an example of modules of an apparatus in accordance with embodiments of this specification.

FIG. 15 depicts examples of modules of an apparatus 1500 in accordance with embodiments of this specification. The apparatus 1500 can be an example of an embodiment of a storage system (e.g., log-structured storage system 300 of FIG. 3). The apparatus 1500 can correspond to the embodiments described above, and the apparatus 1500 includes the following: a receiving module 1502 that receives a processing request of data of a centralized ledger system, wherein types of the data of the centralized ledger system comprise block data, transaction data, and index data; a determining module 1504 that determines a type of the data among the types of the data of the centralized ledger system; and an applying module 1506 that applies a type of a processing engine specified for processing the type of the data according to a characteristic of the type of the data.

In an optional embodiment, the apparatus 1500 further includes a receiving sub-module that receives configurations of a plurality of processing engines, wherein the configurations configure a respective type of a processing engine for processing each of the types of the data of the centralized ledger system according to a characteristic of the each of the types of the data.

In an optional embodiment, the apparatus 1500 includes: a type of a processing engine specified for processing block data; a type of a processing engine specified for processing transaction data; and a type of a processing engine specified for processing index data.

In an optional embodiment, the apparatus 1500 further includes: a receiving sub-module that receives an input/out (I/O) request of the data of the centralized ledger system. The corresponding type of the processing engine specified for processing the type of the data of the centralized ledger system includes a corresponding type of an input/out (I/O) processing engine specified for performing a read or write operation of the type of the data of the centralized ledger system.

In an optional embodiment, the apparatus 1500 further includes a receiving sub-module that receives a data management request of the data of the centralized ledger system. The corresponding type of the processing engine specified for processing the type of the data comprises a corresponding type of a data management processing engine specified for performing a data management operation of the type of the data in the storage system. The management operation comprises one or more of tiering, compaction, compression, erasure coding, or snapshot.

In an optional embodiment, the type of the data is block data or transaction data, and the type of the processing engine specified for processing the type of the data is configured with functions comprising tiering, erasure coding and compression of the block data or transaction data in the storage system.

The system, apparatus, module, or unit illustrated in the previous embodiments can be implemented by using a computer chip or an entity, or can be implemented by using a product having a certain function. A typical embodiment device is a computer (and the computer can be a personal computer), a laptop computer, a cellular phone, a camera phone, a smartphone, a personal digital assistant, a media player, a navigation device, an email receiving and sending device, a game console, a tablet computer, a wearable device, or any combination of these devices.

For an embodiment process of functions and roles of each module in the apparatus, references can be made to an embodiment process of corresponding steps in the previous method. Details are omitted here for simplicity.

Because an apparatus embodiment basically corresponds to a method embodiment, for related parts, references can be made to related descriptions in the method embodiment. The previously described apparatus embodiment is merely an example. The modules described as separate parts may or may not be physically separate, and parts displayed as modules may or may not be physical modules, may be located in one position, or may be distributed on a number of network modules. Some or all of the modules can be selected based on actual demands to achieve the objectives of the solutions of the specification. A person of ordinary skill in the art can understand and implement the embodiments of the present application without creative efforts.

Referring again to FIG. 15, it can be interpreted as illustrating an internal functional module and a structure of a data processing and storage apparatus. The data processing and storage apparatus can be an example of a log-structured storage system (e.g., log-structured storage system 300 of FIG. 3). An execution body in essence can be an electronic device, and the electronic device includes the following: one or more processors; and one or more computer-readable memories configured to store an executable instruction of the one or more processors. In some embodiments, the one or more computer-readable memories are coupled to the one or more processors and have programming instructions stored thereon that are executable by the one or more processors to perform algorithms, methods, functions, processes, flows, and procedures as described in this specification.

Described embodiments of the subject matter can include one or more features, alone or in combination. For example, in a first embodiment, a method includes: receiving, by a storage system, a processing request of data of a centralized ledger system, wherein types of the data of the centralized ledger system comprise block data, transaction data, and index data; determining, by the storage system, a type of the data among the types of the data of the centralized ledger system; and applying, by the storage system, a type of a processing engine specified for processing the type of the data according to a characteristic of the type of the data.

The foregoing and other described embodiments can each, optionally, include one or more of the following features:

A first feature, combinable with any of the following features, specifies that the method further includes: receiving, by the storage system, configurations of a plurality of processing engines, wherein the configurations configure a respective type of a processing engine for processing each of the types of the data of the centralized ledger system according to a characteristic of the each of the types of the data.

A second feature, combinable with any of the previous or following features, specifies that the storage system comprises: a type of a processing engine specified for processing block data; a type of a processing engine specified for processing transaction data; and a type of a processing engine specified for processing index data.

A third feature, combinable with any of the previous or following features, specifies that: receiving, by the storage system, the processing request of the data of the centralized ledger system comprises receiving, by the storage system, an input/out (I/O) request of the data of the centralized ledger system; and the corresponding type of the processing engine specified for processing the type of the data of the centralized ledger system comprises a corresponding type of an input/out (I/O) processing engine specified for performing a read or write operation of the type of the data of the centralized ledger system.

A fourth feature, combinable with any of the previous or following features, specifies that: receiving, by the storage system, the processing request of the data of the centralized ledger system comprises receiving, by the storage system, a data management request of the data of the centralized ledger system; the corresponding type of the processing engine specified for processing the type of the data comprises a corresponding type of a data management processing engine specified for performing a data management operation of the type of the data in the storage system, and the management operation comprises one or more of tiering, compaction, compression, erasure coding, or snapshot.

A fifth feature, combinable with any of the previous features, specifies that the type of the data is block data or transaction data, and the type of the processing engine specified for processing the type of the data is configured with functions comprising tiering, erasure coding and compression of the block data or transaction data in the storage system.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. For example, a computer program carrier can include one or more computer-readable storage media that have instructions encoded or stored thereon. The carrier may be a tangible non-transitory computer-readable medium, such as a magnetic, magneto optical, or optical disk, a solid state drive, a random access memory (RAM), a read-only memory (ROM), or other types of media. Alternatively, or in addition, the carrier may be an artificially generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

Processors for execution of a computer program include, by way of example, both general- and special-purpose microprocessors, and any one or more processors of any kind of digital computer. Generally, a processor will receive the instructions of the computer program for execution as well as data from a non-transitory computer-readable medium coupled to the processor.

The term "data processing apparatus" encompasses all kinds of apparatuses, devices, and machines for processing data, including by way of example a programmable processor, a computer, or multiple processors or computers. Data processing apparatus can include special-purpose logic circuitry, e.g., an FPGA (field programmable gate array), an ASIC (application specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

The processes and logic flows described in this specification can be performed by one or more computers or processors executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more storage devices. The storage devices can be, for example, magnetic, magneto optical, or optical disks, solid state drives, or any other type of non-transitory, computer-readable media. However, a computer need not have such devices. Thus, a computer may be coupled to one or more storage devices, such as, one or more memories, that are local and/or remote. For example, a computer can include one or more local memories that are integral components of the computer, or the computer can be coupled to one or more remote memories that are in a cloud network. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Components can be "coupled to" each other by being commutatively such as electrically or optically connected to one another, either directly or via one or more intermediate components. Components can also be "coupled to" each other if one of the components is integrated into the other. For example, a storage component that is integrated into a processor (e.g., an L2 cache component) is "coupled to" the processor.

To provide for interaction with a user, embodiments of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific embodiment details, these should not be construed as limitations on the scope of what is being claimed, which is defined by the claims themselves, but rather as descriptions of features that may be specific to particular embodiments. Certain features that are described in this specification in the context of separate embodiments can also be realized in combination in a single embodiment. Conversely, various features that are described in the context of a single embodiments can also be realized in multiple embodiments separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
receiving, by a storage system, a processing request of first data generated by a centralized ledger system, wherein the centralized ledger system comprises a central trusted authority node, stores data in blocks of a blockchain data structure, and generates types of data of the centralized ledger system comprising block data and index data, wherein the block data comprise at least one block in a blockchain, and the at least one block comprises a hash value of a previous block of the blockchain data structure;
in response to determining a type of the first data generated by the centralized ledger system to be the block data among the types of data of the centralized ledger system, applying, by the storage system, a corresponding type of a processing engine specified for processing the block data, wherein the corresponding type of the processing engine specified for processing the block data is configured with one or more first functions based on a characteristic of the block data;
receiving, by the storage system, a processing request of second data generated by the centralized ledger system; and
in response to determining a type of the second data generated by the centralized ledger system to be the index data among the types of data of the centralized ledger system, applying, by the storage system, a corresponding type of a processing engine specified for processing the index data, wherein the corresponding type of the processing engine specified for processing the index data is configured with one or more second functions based on a characteristic of the index data, and the one or more first functions are different from the one or more second functions.

2. The computer-implemented method of claim 1, wherein the types of data of the centralized ledger system further comprise transaction data, and the method further comprises:
receiving, by the storage system, a processing request of third data generated by the centralized ledger system; and
in response to determining a type of the third data generated by the centralized ledger system to be the transaction data among the types of the data of the centralized ledger system,
applying, by the storage system, a corresponding type of a processing engine specified for processing the transaction data, wherein the corresponding type of the processing engine specified for processing the transaction data is configured with one or more third functions based on a characteristic of the transaction data.

3. The computer-implemented method of claim 2, further comprising: receiving, by the storage system, configurations of a plurality of processing engines, wherein the configurations configure a respective type of a processing engine for processing each of the types of the data of the centralized ledger system according to a characteristic of the each of the types of the data.

4. The computer-implemented method of claim 1, wherein:
receiving, by the storage system, the processing request of the first data generated by the centralized ledger system comprises receiving, by the storage system, an input/out (I/O) request of the block data generated by the centralized ledger system;
the corresponding type of the processing engine specified for processing the block data of the centralized ledger system comprises a corresponding type of an input/out (I/O) processing engine specified for performing a read or write operation of the block data of the centralized ledger system;
receiving, by the storage system, the processing request of the second data generated by the centralized ledger system comprises receiving, by the storage system, an input/out (I/O) request of the index data generated by the centralized ledger system; and
the corresponding type of the processing engine specified for processing the index data of the centralized ledger system comprises a corresponding type of an input/out (I/O) processing engine specified for performing a read or write operation of the index data of the centralized ledger system.

5. The computer-implemented method of claim 1, wherein:
receiving, by the storage system, the processing request of the first data generated by the centralized ledger system comprises receiving, by the storage system, a data management request of the block data generated by the centralized ledger system;
the corresponding type of the processing engine specified for processing the block data of the centralized ledger system comprises a corresponding type of a data management processing engine specified for performing a first data management operation of the block data of the centralized ledger system based on a characteristic of the block data;
receiving, by the storage system, the processing request of the second data generated by the centralized ledger system comprises receiving, by the storage system, a data management request of the index data generated by the centralized ledger system; and
the corresponding type of the processing engine specified for processing the index data of the centralized ledger system comprises a corresponding type of a data management processing engine specified for performing a second data management operation of the index data of the centralized ledger system based on a characteristic of the index data.

6. The computer-implemented method of claim 1, wherein the one or more first functions comprise tiering, erasure coding and compression of the block data in the storage system.

7. The computer-implemented method of claim 1, wherein the centralized ledger system comprises storing the data in blocks of the blockchain data structure without performing a consensus process.

8. The computer-implemented method of claim 1, wherein the index data comprise one or more of an index indicating a physical storage location of data in the storage system, an index indicating a correspondence from a sequence to a transaction storage location, or an index indicating a correspondence from a timing sequence to a transaction hash.

9. A non-transitory, computer-readable storage medium storing one or more instructions executable by a computer system to perform operations for data processing and storage, the operations comprising:
receiving, by a storage system, a processing request of first data generated by a centralized ledger system, wherein the centralized ledger system comprises a central trusted authority node, stores data in blocks of a blockchain data structure, and generates types of data of the centralized ledger system comprising block data and index data, wherein the block data comprise at least one block in a blockchain, and the at least one block comprises a hash value of a previous block of the blockchain data structure;

in response to determining a type of the first data generated by the centralized ledger system to be the block data among the types of data of the centralized ledger system, applying, by the storage system, a corresponding type of a processing engine specified for processing the block data, wherein the corresponding type of the processing engine specified for processing the block data is configured with one or more first functions based on a characteristic of the block data;

receiving, by the storage system, a processing request of second data generated by the centralized ledger system; and in response to determining a type of the second data generated by the centralized ledger system to be the index data among the types of data of the centralized ledger system, applying, by the storage system, a corresponding type of a processing engine specified for processing the index data, wherein the corresponding type of the processing engine specified for processing the index data is configured with one or more second functions based on a characteristic of the index data, and the one or more first functions are different from the one or more second functions.

10. The non-transitory, computer-readable storage medium of claim 9, wherein the types of data of the centralized ledger system further comprise transaction data, and the operations further comprise:

receiving, by the storage system, a processing request of third data generated by the centralized ledger system; and in response to determining a type of the third data generated by the centralized ledger system to be the transaction data among the types of the data of the centralized ledger system, applying, by the storage system, a corresponding type of a processing engine specified for processing the transaction data, wherein the corresponding type of the processing engine specified for processing the transaction data is configured with one or more third functions based on a characteristic of the transaction data.

11. The non-transitory, computer-readable storage medium of claim 10, the operations further comprising: receiving, by the storage system, configurations of a plurality of processing engines, wherein the configurations configure a respective type of a processing engine for processing each of the types of the data of the centralized ledger system according to a characteristic of the each of the types of the data wherein.

12. The non-transitory, computer-readable storage medium of claim 9, wherein:

receiving, by the storage system, the processing request of the first data generated by the centralized ledger system comprises receiving, by the storage system, an input/out (I/O) request of the block data generated by the centralized ledger system;

the corresponding type of the processing engine specified for processing the block data of the centralized ledger system comprises a corresponding type of an input/out (I/O) processing engine specified for performing a read or write operation of the block data of the centralized ledger system;

receiving, by the storage system, the processing request of the second data generated by the centralized ledger system comprises receiving, by the storage system, an input/out (I/O) request of the index data generated by the centralized ledger system; and the corresponding type of the processing engine specified for processing the index data of the centralized ledger system comprises a corresponding type of an input/out (I/O) processing engine specified for performing a read or write operation of the index data of the centralized ledger system.

13. The non-transitory, computer-readable storage medium of claim 9, wherein:

receiving, by the storage system, the processing request of the first data generated by the centralized ledger system comprises receiving, by the storage system, a data management request of the block data generated by the centralized ledger system;

the corresponding type of the processing engine specified for processing the block data of the centralized ledger system comprises a corresponding type of a data management processing engine specified for performing a first data management operation of the block data of the centralized ledger system based on a characteristic of the block data;

receiving, by the storage system, the processing request of the second data generated by the centralized ledger system comprises receiving, by the storage system, a data management request of the index data generated by the centralized ledger system; and the corresponding type of the processing engine specified for processing the index data of the centralized ledger system comprises a corresponding type of a data management processing engine specified for performing a second data management operation of the index data of the centralized ledger system based on a characteristic of the index data.

14. The non-transitory, computer-readable storage medium of claim 9, wherein the one or more first functions comprise tiering, erasure coding and compression of the block data in the storage system.

15. A storage system, comprising:
one or more processors; and
one or more computer-readable memories coupled to the one or more processors and having instructions stored thereon that are executable by the one or more processors to perform operations comprising:

receiving, by a storage system, a processing request of first data generated by a centralized ledger system, wherein the centralized ledger system comprises a central trusted authority node, stores data in blocks of a blockchain data structure, and generates types of data of the centralized ledger system comprising block data and index data, wherein the block data comprise at least one block in a blockchain, and the at least one block comprises a hash value of a previous block of the blockchain data structure;

in response to determining a type of the first data generated by the centralized ledger system to be the block data among the types of data of the centralized ledger system, applying, by the storage system, a corresponding type of a processing engine specified for processing the block data, wherein the corresponding type of the processing engine specified for processing the block data is configured with one or more first functions based on a characteristic of the block data;

receiving, by the storage system, a processing request of second data generated by the centralized ledger system; and in response to determining a type of the second data generated by the centralized ledger system to be the index data among the types of data of the centralized ledger system, applying, by the storage system, a corresponding type of a processing engine specified for processing the index data, wherein the corresponding type of the processing engine specified for processing the index data is configured with one or more second functions based on a characteristic of the index data, and the one or more first functions are different from the one or more second functions.

16. The storage system of claim 15, wherein the types of data of the centralized ledger system further comprise transaction data, and the operations further comprise:

receiving, by the storage system, a processing request of third data generated by the centralized ledger system; and in response to determining a type of the third data generated by the centralized ledger system to be the transaction data among the types of the data of the centralized ledger system, applying, by the storage system, a corresponding type of a processing engine specified for processing the transaction data, wherein the corresponding type of the processing engine specified for processing the transaction data is configured with one or more third functions based on a characteristic of the transaction data.

17. The storage system of claim 16, the operations further comprising: receiving, by the storage system, configurations of a plurality of processing engines, wherein the configurations configure a respective type of a processing engine for processing each of the types of the data of the centralized ledger system according to a characteristic of the each of the types of the data.

18. The storage system of claim 15, wherein:

receiving, by the storage system, the processing request of the first data generated by the centralized ledger system comprises receiving, by the storage system, an input/out (I/O) request of the block data generated by the centralized ledger system;

the corresponding type of the processing engine specified for processing the block data of the centralized ledger system comprises a corresponding type of an input/out (I/O) processing engine specified for performing a read or write operation of the block data of the centralized ledger system;

receiving, by the storage system, the processing request of the second data generated by the centralized ledger system comprises receiving, by the storage system, an input/out (I/O) request of the index data generated by the centralized ledger system; and the corresponding type of the processing engine specified for processing the index data of the centralized ledger system comprises a corresponding type of an input/out (I/O) processing engine specified for performing a read or write operation of the index data of the centralized ledger system.

19. The storage system of claim 15, wherein:

receiving, by the storage system, the processing request of the first data generated by the centralized ledger system comprises receiving, by the storage system, a data management request of the block data generated by the centralized ledger system;

the corresponding type of the processing engine specified for processing the block data of the centralized ledger system comprises a corresponding type of a data management processing engine specified for performing a first data management operation of the block data of the centralized ledger system based on a characteristic of the block data;

receiving, by the storage system, the processing request of the second data generated by the centralized ledger system comprises receiving, by the storage system, a data management request of the index data generated by the centralized ledger system; and the corresponding type of the processing engine specified for processing the index data of the centralized ledger system comprises a corresponding type of a data management processing engine specified for performing a second data management operation of the index data of the centralized ledger system based on a characteristic of the index data.

20. The storage system of claim 15, wherein the one or more first functions comprise tiering, erasure coding and compression of the block data in the storage system.

* * * * *

UNITED STATES PATENT AND TRADEMARK OFFICE
CERTIFICATE OF CORRECTION

Page 1 of 2

PATENT NO. : 10,789,215 B1
APPLICATION NO. : 16/712440
DATED : September 29, 2020
INVENTOR(S) : Shikun Tian It is certified that error appears in the above-identified patent and that said Letters Patent is hereby corrected as shown below:

In the Claims

Column 44/Line 2 – In Claim 4, delete "input/out (I/O)" and insert -- input/output (I/O) --, therefor.

Column 44/Lines 6-7 – In Claim 4, delete "input/out (I/O)" and insert -- input/output (I/O) --, therefor.

Column 44/Line 13 – In Claim 4, delete "input/out (I/O)" and insert -- input/output (I/O) --, therefor.

Column 44/Lines 16-17 – In Claim 4, delete "input/out (I/O)" and insert -- input/output (I/O) --, therefor.

Column 45/Line 57 – In Claim 11, delete "data wherein" and insert -- data --, therefor.

Column 45/Lines 62-63 – In Claim 12, delete "input/out (I/O)" and insert -- input/output (I/O) --, therefor.

Column 45/Line 67 to Column 46/Line 1 – In Claim 12, delete "input/out (I/O)" and insert -- input/output (I/O) --, therefor.

Column 46/Line 7 – In Claim 12, delete "input/out (I/O)" and insert -- input/output (I/O) --, therefor.

Column 46/Lines 11-12 – In Claim 12, delete "input/out (I/O)" and insert -- input/output (I/O) --, therefor.

Column 47/Lines 44-45 – In Claim 18, delete "input/out (I/O)" and insert -- input/output (I/O) --, therefor.

Column 48/Lines 3-4 – In Claim 18, delete "input/out (I/O)" and insert -- input/output (I/O) --, therefor.

Signed and Sealed this
Second Day of November, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,789,215 B1

Column 48/Line 10 – In Claim 18, delete "input/out (I/O)" and insert -- input/output (I/O) --, therefor.

Column 48/Lines 14-15 – In Claim 18, delete "input/out (I/O)" and insert -- input/output (I/O) --, therefor.